United States Patent
Omori et al.

(10) Patent No.: US 7,668,155 B2
(45) Date of Patent: Feb. 23, 2010

(54) IP TELEPHONY SYSTEM, VOIP TERMINAL, AND METHOD AND PROGRAM FOR REPRODUCING HOLD SOUND OR AUDIBLE SOUND USED THEREIN

(75) Inventors: Michiko Omori, Tokyo (JP); Mao Masuhiro, Tokyo (JP); Yasuhiro Watanabe, Tokyo (JP)

(73) Assignee: NEC Corporation (JP)

( * ) Notice: Subject to any disclaimer, the term of this patent is extended or adjusted under 35 U.S.C. 154(b) by 1156 days.

(21) Appl. No.: 10/970,056

(22) Filed: Oct. 21, 2004

(65) Prior Publication Data
US 2005/0100055 A1    May 12, 2005

(30) Foreign Application Priority Data
Oct. 22, 2003    (JP)    ............................. 2003-361340

(51) Int. Cl.
*H04L 1/00*    (2006.01)
*H04J 3/06*    (2006.01)
(52) U.S. Cl. ........................................ 370/352; 370/516
(58) Field of Classification Search ................. 370/352, 370/516
See application file for complete search history.

(56) References Cited
FOREIGN PATENT DOCUMENTS

| | | |
|---|---|---|
| JP | 2000-059471 | 2/2000 |
| JP | 2001-211235 | 8/2001 |
| JP | 2002-209025 | 7/2002 |
| JP | 2002-351465 | 12/2002 |
| WO | WO 03/053029 A1 | 6/2003 |

OTHER PUBLICATIONS

Japanese Office Action dated Jul. 22, 2008 (with English translation of the relevant parts).

*Primary Examiner*—Rasha S Al Aubaidi
(74) *Attorney, Agent, or Firm*—Ostrolenk Faber LLP

(57) ABSTRACT

A hold sound and audible sound data memory area of a memory holds a plurality of types of hold sound and audible sound data which are stored in a payload format of an RTP packet. An RTP/hold sound or audible sound switching function writes one of an RTP packet and the hold sound or audible sound data into a DSP. A hold sound or audible sound data selection function selects a hold sound or audible sound to be reproduced from the plurality of types of hold sound and audible sound data. A hold sound or audible sound intermittence control function restricts the input of the hold sound or audible sound data into the DSP, to control the intermittence of the hold sound or audible sound. A hold sound or audible sound periodic reproduction function periodically inputs the hold sound or audible sound data into the DSP. The DSP converts the RTP packet such as voice or the hold sound or audible sound data into a voice signal of a PCM signal.

52 Claims, 22 Drawing Sheets

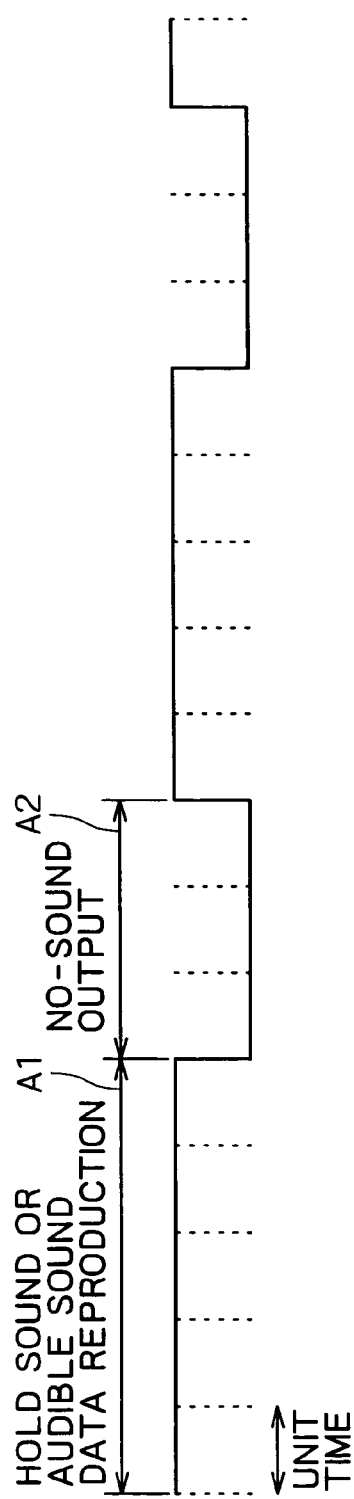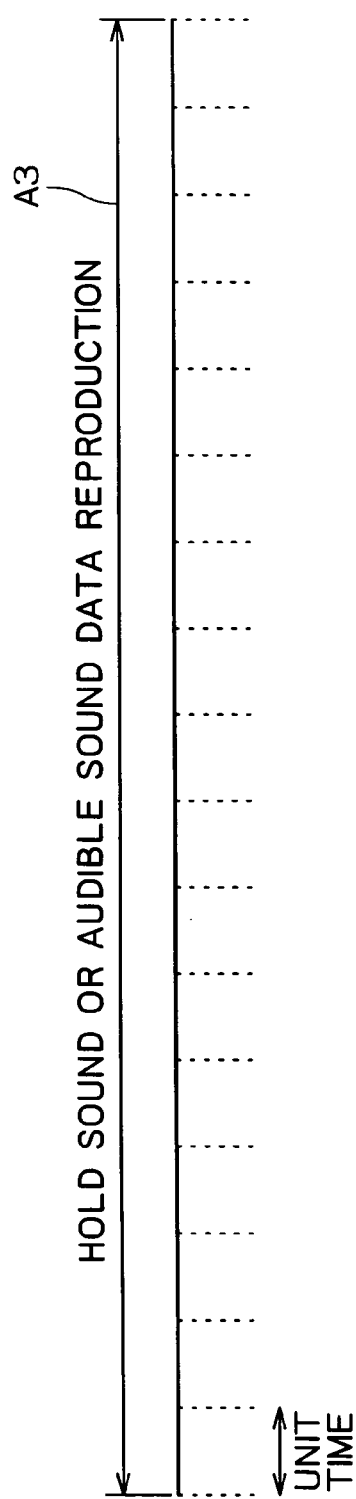

IP TELEPHONY SYSTEM, VOIP TERMINAL, AND METHOD AND PROGRAM FOR REPRODUCING HOLD SOUND OR AUDIBLE SOUND USED THEREIN

BACKGROUND OF THE INVENTION

1. Field of the Invention

The present invention relates to an IP (Internet Protocol) telephony system, a VoIP (Voice over Internet Protocol) terminal, and a method and a program for reproducing a hold sound or an audible sound used in the IP telephony system and the VoIP terminal. The present invention especially relates to improvement in the method for reproducing a hold sound or an audible sound, by which the hold sound or audible sound is accumulated in the VoIP terminal in a payload format of an RTP (Real-time Transport Protocol) packet and is reproduced. The VoIP terminal includes a media gateway, a media converter, an IP telephone and the like, which are call controlled by a multimedia gateway controller of the IP telephony system through the Internet, an intranet, and a LAN (Local Area Network), respectively.

2. Description of the Related Art

A conventional VoIP terminal such as a media gateway, a media converter, and an IP telephone in an IP telephony system has a DSP (Digital Signal Processor) for converting an RTP packet from an IP network into a PCM (Pulse Code Modulation) signal, a hold sound source and an audible sound source, a sound source data selection function for selecting data to be reproduced from data stored in each sound source, a CODEC for converting the selected data into a PCM signal, and a selector function for selecting the PCM output from the DSP or that from the CODEC in accordance with which of voice and a hold sound or an audible sound is reproduced. When a hold sound and an audible sound are stored in a PCM signal format, the CODEC may be unnecessary (Japanese Patent Laid-Open Publication No. 2000-59471 and the like).

A method for reproducing a hold sound or an audible sound in the VoIP terminal of the IP telephony system will be described with reference to FIGS. 1 and 2. FIG. 1 shows the structure of the conventional VoIP terminal, and FIG. 2 shows the operation of the conventional VoIP terminal.

Referring to FIG. 1, a multimedia gateway controller (MGC) 1 at least comprises a main processor 11, a memory 13, and a LAN (local area network, such as Ethernet (R)) IF (interface) 12.

A VoIP terminal 8 at least comprises a LAN-IF 81, a CPU 82, a memory 83, a call control function 84, a jitter buffer control function 85, a DSP control function 86, a selector control function 87, a hold sound or audible sound source data selection function 88, a jitter buffer 89, a DSP 90, a hold sound source and audible sound source 91, a CODEC 92, and a selector 93. The multimedia gateway controller 1 is connected to the VoIP terminal 8 through a LAN 100.

Then, the operation of the method for reproducing a hold sound or an audible sound in the conventional VoIP terminal 8 will be described with reference to FIG. 2. By way of example, a flow in a case where the VoIP terminal 8, which has already carried out voice communication, sends out the hold sound will be described.

The CPU 82 of the VoIP terminal 8 inputs voice RTP packets, which are inputted through the LAN-IF 81, into the jitter buffer 89 by use of the call control function 84, the jitter buffer control function 85, and the DSP control function 86 (step S81 of FIG. 2). The jitter buffer 89 absorbs the delay of a network, and then writes the RTP packets into the DSP 90 at regular intervals (for example, intervals of 10 ms). A voice PCM signal outputted from the DSP 90 is inputted into the selector 93 (a state of voice communication) (step S82 of FIG. 2).

When the call control function 84 operates, the CPU 82 determines to perform voice communication, and controls the selector 93 so as to select the voice PCM signal from the DSP 90 as PCM signal output from the selector 93 by using the selector control function 87 (step S83 of FIG. 2).

In sending out the hold sound from this state, the CPU 82 selects designated hold sound data from the hold sound source and audible sound source 91 by use of the hold sound and audible sound source data selection function 88 in order to input the hold sound data into the CODEC 92. The CODEC 92 inputs the selected hold sound data into the selector 93 as a hold sound PCM signal (steps S84 and S85 in FIG. 2).

When the call control function 84 operates and the CPU 82 determines to send out the hold sound, the CPU 82 controls the selector 93 so as to select the hold sound PCM signal as the PCM signal output from the selector 93 by using the selector control function 87 (a state of hold sound reproduction and sending) (steps S86 to S88 of FIG. 2).

In the conventional method for reproducing the hold sound or audible sound, the hold sound is reproduced in the VoIP terminal 8 by the structure and the operation as described above. In the conventional method for reproducing the hold sound or audible sound, the reproduction of the audible sound is also carried out in similar operation to above.

According to the foregoing method for reproducing the hold sound or audible sound in the conventional VoIP terminal, in addition to the DSP for converting the RTP packet into the PCM signal, the CODEC for converting a signal from the sound source of the hold sound and audible sound into the PCM signal, and the RTP/hold sound or audible sound selector for selecting from among the PCM signal such as voice outputted from the DSP and the PCM signal outputted from the CODEC or the sound source of the hold sound and audible sound are necessary. The CODEC and the selector cause increase in cost.

As a method for holding the sound source of the hold sound and the audible sound, a non-volatile memory or a specialized LSI (Large-Scale Integration) is often used. In this case, however, it is difficult to arbitrarily copy a hold sound or an audible sound, which is differently required from user to user or from country to country, from a download server to the VoIP terminal for use. Therefore, there is a problem that the conventional method cannot flexibly meet user's needs.

In a method for holding the sound source of the hold sound or the audible sound with the use of a volatile memory, on the other hand, it is necessary to provide a memory for storing the sound source of the hold sound and the audible sound separately from a memory for executing a program of the VoIP terminal, and hence there is a problem of increase in cost.

SUMMARY OF THE INVENTION

To solve the foregoing problems, an object of the present invention is to provide an IP telephony system, a VoIP terminal, and a method and a program for reproducing a hold sound or an audible sound used therein, which can prevent increase in cost in realizing the reproduction of the hold sound and audible sound in the VoIP terminal.

Another object of the present invention is to provide an IP telephony system, a VoIP terminal, and a method and a program for reproducing a hold sound or an audible sound used therein, which can flexibly and arbitrarily select a hold sound and an audible sound, which are differently required from user to user, from country to country or the like.

An IP telephony system according to the present invention comprises a VoIP (Voice over Internet Protocol) terminal; and a gateway controller for call controlling the VoIP terminal through a transmission line. The VoIP terminal includes a jitter buffer for temporality holding a voice packet inputted through the transmission line to absorb delay, and a conversion section for converting the voice packet held by the jitter buffer into a voice signal. In the IP telephony system, the VoIP terminal comprises: a data memory area for holding a plurality of types of hold sound or audible sound data in a payload format of the voice packet; a data selection section for selecting a hold sound or an audible sound to be reproduced from the plurality of types of hold sound or audible sound data held in the data memory area; a switching section for selecting any one of the voice packet and the hold sound or audible sound data to output it to the conversion section; a control section for controlling writing of any one of the voice packet and the hold sound or audible sound data into the conversion section, or for commanding the conversion section to output no sound; an intermittence control section for controlling the intermittence of the hold sound or audible sound by restricting the input of the hold sound or audible sound data into the conversion section; and a periodic reproduction section for periodically outputting the hold sound or audible sound data to the conversion section. The conversion section converts the voice packet and the hold sound or audible sound data held in the data memory area into the voice signal.

A VoIP terminal according to the present invention is call controlled by a gateway controller through a transmission line. The VoIP terminal includes a jitter buffer for temporality holding a voice packet inputted through the transmission line to absorb delay, and a conversion section for converting the voice packet held by the jitter buffer into a voice signal. The VoIP terminal further comprises: a data memory area for holding a plurality of types of hold sound or audible sound data in a payload format of the voice packet; a data selection section for selecting a hold sound or an audible sound to be reproduced from the plurality of types of hold sound or audible sound data held in the data memory area; a switching section for selecting any one of the voice packet and the hold sound or audible sound data and outputting it to the conversion section; a control section for controlling writing of any one of the voice packet and the hold sound or audible sound data into the conversion section, or for commanding the conversion section to output no sound; an intermittence control section for controlling the intermittence of the hold sound or audible sound by restricting the input of the hold sound or audible sound data into the conversion section; and a periodic reproduction section for periodically outputting the hold sound or audible sound data to the conversion section. The conversion section converts the voice packet and the hold sound or audible sound data held in the data memory area into the voice signal.

A method for reproducing a hold sound or an audible sound according to the present invention is applicable to an IP telephony system, which comprises a VoIP (Voice over Internet Protocol) terminal and a gateway controller for call controlling the VoIP terminal through a transmission line. The VoIP terminal includes a jitter buffer for temporality holding a voice packet inputted through the transmission line to absorb delay, and a conversion section for converting the voice packet held by the jitter buffer into a voice signal. In the IP telephony system with the VoIP terminal, the method for reproducing the hold sound or audible sound comprises the steps of: selecting a hold sound or an audible sound to be reproduced from a plurality of types of hold sound or audible sound data held in a data memory area, which holds the plurality of types of hold sound or audible sound data in the VoIP terminal in a payload format of the voice packet; selecting any one of the voice packet and the hold sound or audible sound data, and outputting it to the conversion section; controlling writing of any one of the voice packet and the hold sound or audible sound data into the conversion section, or commanding the conversion section to output no sound; controlling the intermittence of the hold sound or the audible sound by restricting the input of the hold sound or audible sound data into the conversion section; and periodically outputting the hold sound or audible sound data to the conversion section. The conversion section converts the voice packet and the hold sound or audible sound data held in the data memory area into the voice signal.

A program providing a method for reproducing a hold sound or an audible sound according to the present invention is applicable to an IP telephony system, which comprises a VoIP (Voice over Internet Protocol) terminal and a gateway controller for call controlling the VoIP terminal through a transmission line. The VoIP terminal includes a jitter buffer for temporality holding a voice packet inputted through the transmission line to absorb delay, and a conversion section for converting the voice packet held by the jitter buffer into a voice signal. In the IP telephony system with the VoIP terminal, the program makes a computer carry out processing of: selecting a hold sound or an audible sound to be reproduced from a plurality of types of hold sound or audible sound data held in a data memory area, which holds the plurality of types of hold sound and audible sound data in a payload format of the voice packet; selecting any one of the voice packet and the hold sound or audible sound data, and outputting it to the conversion section; controlling writing of any one of the voice packet and the hold sound or audible sound data into the conversion section, or commanding the conversion section to output no sound; controlling the intermittence of the hold sound or the audible sound by restricting the input of the hold sound or audible sound data into the conversion section; and periodically outputting the hold sound or audible sound data to the conversion section. The conversion section converts the voice packet and the hold sound or audible sound data held in the data memory area into the voice signal.

In other words, in the IP telephony system according to the present invention, a multimedia gateway controller (MGC) call controls the VoIP (Voice over Internet Protocol) terminal such as a media gateway, a media converter, and an IP telephone through the Internet, an intranet, or a LAN (Local Area Network).

In an IP telephony system according to a first aspect of the present invention, a VoIP terminal comprises a processor for controlling its own terminal, a volatile memory (for example, an SDRAM (Synchronous Dynamic Random Access Memory)), a jitter buffer, a hold sound and audible sound data memory area, an RTP (Real-time Transport Protocol)/hold sound or audible sound switching function, a DSP (Digital Signal Processor), a hold sound or audible sound data selection function, a hold sound or audible sound intermittence control function, and a hold sound or audible sound periodic reproduction function.

The jitter buffer temporality holds an RTP packet of voice, which is inputted through the Internet, an intranet, or a LAN, to absorb delay. The hold sound and audible sound data memory area holds a plurality of types of hold sound and audible sound data, which are held in the volatile memory in a payload format of the RTP packet.

The RTP/hold sound or audible sound switching function controls writing of any one of the RTP packet and the hold sound or audible sound data into the DSP. The DSP converts the RTP packet of the voice held by the jitter buffer or the hold sound or audible sound data held in the hold sound and audible sound data memory area into a voice signal of a PCM (Pulse Code Modulation) signal.

The hold sound or audible sound data selection function selects a hold sound or an audible sound to be reproduced from the plurality of types of hold sound or audible sound data. The hold sound or audible sound intermittence control function controls the intermittence of the hold sound or audible sound by restricting the input of the hold sound or audible sound data into the DSP. The hold sound or audible sound periodic reproduction function periodically inputs the hold sound or audible sound data into the DSP.

According to the IP telephony system of the first aspect of the present invention, as described above, in the VoIP terminal, the plurality of types of hold sound and audible sound data are stored on the memory in the payload format of the RTP packet. The hold sound or audible sound data to be reproduced is selected from the plurality of types of hold sound or audible sound data in accordance with a state of call control, and written into the DSP as the RTP packet. Thus, a memory for the hold sound source and audible sound source, a selector, a CODEC, and hardware as a peripheral circuit thereof dedicated for the reproduction of the hold sound or audible sound are unnecessary, so that it is possible to reduce the cost of a device.

In an IP telephony system according to a second aspect of the present invention, a VoIP terminal has a hold sound and audible sound data hold area and a hold sound or audible sound copy function in addition to the foregoing structure. Hold sound and audible sound data are stored on the hold sound and audible sound data hold area in a non-volatile memory. The hold sound or audible sound copy function copies a hold sound or an audible sound stored on the hold sound and audible sound data hold area in the non-volatile memory into a hold sound and audible sound data memory area in a volatile memory.

Accordingly, in the IP telephony system according to the second aspect of the present invention, the non-volatile memory, which generally has slow memory access speed, is used as a memory area for containing the hold sound and audible sound data, and the volatile memory, which generally has fast memory access speed, is used as a memory for reproducing the hold sound or audible sound data. Therefore, increase in the memory access speed in reproducing the hold sound or audible sound makes it possible to reduce a processing load in reproducing the hold sound or audible sound.

In an IP telephony system according to a third aspect of the present invention, a VoIP terminal has a hold sound and audible sound sort and copy function in addition to the foregoing structure. Hold sound and audible sound data stored on a non-volatile memory are grouped on the basis of a country, a user, and a PCM code rule in accordance with a method for composing a hold sound and audible sound data hold area, when the own terminal is activated. The hold sound and audible sound sort and copy function selects one group from a plurality of hold sound and audible sound data memories in the non-volatile memory, and copies it into a hold sound and audible sound data memory area in the volatile memory.

Therefore, in the IP telephony system according to the third aspect of the present invention, the VoIP terminal has information organized by country, information specific to the user, and information about the PCM code rule, and one pair of hold sound and audible sound data is sorted out from the plurality of groups of hold sound and audible sound data held by the non-volatile memory on the basis of the information. The pair of hold sound and audible sound data is copied from the non-volatile memory into the volatile memory, so that it is possible to minimize the hold sound and audible sound data memory area in the volatile memory.

In an IP telephony system according to a fourth aspect of the present invention, a VoIP terminal has a function by which the own terminal searches through a download server for a download list in response to activation by a maintenance console of its own terminal, and the function of writing the plurality of types of hold sound and audible sound data on the download server into a hold sound and audible sound data hold area of a non-volatile memory of its own terminal in accordance with a search result, in addition to the foregoing structure.

Therefore, in the IP telephony system according to the fourth aspect of the present invention, the VoIP terminal writes the plurality of types of hold sound and audible sound data stored on the download server into the hold sound and audible sound data hold area of the non-volatile memory of the VoIP terminal, in response to the activation by the maintenance console of the VoIP terminal. Accordingly, the hold sound and audible sound data stored on the non-volatile memory is arbitrarily changeable, and hence it is possible to flexibly meet user's needs.

In an IP telephony system according to a fifth aspect of the present invention, a VoIP terminal holds a plurality of types of hold sound and audible sound in accordance with a method for composing a hold sound and audible sound data hold area, by which hold sound and audible sound data is grouped on the basis of a country, a user, and a PCM code rule and stored on a non-volatile memory of the own VoIP terminal. The IP telephony system has a terminal registration request function for requesting a multimedia gateway controller of the IP telephony system to register the terminal, when the own terminal is activated.

The multimedia gateway controller has a type information designation and notification function, which designates a country, a user, and a PCM code rule and notifies them to the VoIP terminal in approving the registration of the VoIP terminal of a requester. The VoIP terminal has a hold sound and audible sound type selective use function, by which only a type designated by a type information designation notification is used as the hold sound and audible sound data.

Therefore, in the IP telephony system according to the fifth aspect of the present invention, the multimedia gateway controller informs the VoIP terminal of information organized by country, information specific to the user, and information about the PCM code rule in activating the VoIP terminal, in order to designate the type of hold sound and audible sound data used in the VoIP terminal. Therefore, it is possible to unify a type of hold sound and audible sound in the IP telephony system.

In an IP telephony system according to a sixth aspect of the present invention, a multimedia gateway controller has a sound source data type notification function, which notifies a VoIP terminal of a type of sound source data to be reproduced in accordance with a state of call control, in a case that a plurality of types of hold sound or audible sound data stored in a payload format of RTP packets on a volatile memory of the VoIP terminal are grouped based on its type.

The VoIP terminal has a sound source data designation and reproduction function, by which a DSP reproduces sound source data of a type designated by the sound source data type notification function. Furthermore, the multimedia gateway controller has a hold sound or audible sound reproduction start command function and a hold sound or audible sound reproduction end command function acting on the VoIP terminal.

Therefore, in the IP telephony system according to the sixth aspect of the present invention, the VoIP terminal can specify the type of hold sound or audible sound data to be reproduced without judging a call state, because the multimedia gateway controller designates the type of hold sound or audible sound data used in reproduction to the VoIP terminal during the call control. Also, it is possible to prevent disparity in a state of hold sound or audible sound reproduction between the multimedia gateway controller and the VoIP terminal.

In an IP telephony system according to a seventh aspect of the present invention, hold sound or audible sound data preserved or stored on a non-volatile memory or a volatile memory of a VoIP terminal comprises a reproduction pause counter value, a reproduction counter value, and reproduction data in a payload format of an RTP packet. The reproduction data contains a plurality of units of payload data of a time interval (for example, 10 ms), at which a DSP takes in the RTP packet.

Therefore, in the IP telephony system according to the seventh aspect of the present invention, each of the hold sound and audible sound data stored on the non-volatile memory and the volatile memory comprises payload data, the reproduction pause counter value and the reproduction counter value. The payload data being sound source data itself is composed of a plurality of units of reproduction data of the time interval, at which the DSP reads the RTP packet. Thus, it is possible to carry out intermittence control in reproducing a hold sound or an audible sound, and hence it is possible to flexibly make the reproduction/pause timing of the hold sound or audible sound.

In an IP telephony system according to an eighth aspect of the present invention, as a method for writing reproduction data stored on a volatile memory of a VoIP terminal into a DSP, there is a method by which a reproduction pause counter value or a reproduction counter value is copied into a reproduction/pause counter on a work memory, and is subtracted at time intervals, at which the DSP takes in an RTP packet. Subtraction is carried out until the reproduction/pause counter becomes zero.

In reproducing a hold sound or an audible sound, the reproduction counter value is first copied into the reproduction/pause counter, and payload data of the reproduction data is written into the DSP one by one whenever the subtraction is carried out. When the reproduction/pause counter, into which the reproduction counter value is copied, becomes zero, the reproduction pause counter value is copied into the reproduction/pause counter. The reproduction data is written into the DSP to pause, until a result of the subtraction of the reproduction pause counter value becomes zero. When the reproduction/pause counter, into which the reproduction pause counter value is copied, becomes zero, the reproduction counter value is copied into the reproduction/pause counter.

Therefore, in the IP telephony system according to the eighth aspect of the present invention, each of the hold sound and audible sound data has the reproduction pause counter value and the reproduction counter value, and the work memory in the volatile memory is provided with the reproduction pause counter. A method, by which the reproduction pause counter value and the reproduction counter value are alternatively set when the reproduction pause counter becomes zero, is adopted, so that it is possible to make the reproduction/pause timing of the hold sound or audible sound n times as much as a time interval, at which the DSP takes in the RTP packet.

According to an IP telephony system of a ninth aspect of the present invention, a single unit of payload data in reproduction data stored on a volatile memory of a VoIP terminal includes reproduction sound data and no-sound data as payload data, in order to reproduce pause time within a time interval, at which a DSP takes in an RTP packet.

Therefore, in the IP telephony system according to the ninth aspect of the present invention, the reproduction sound data and the no-sound data are stored as the payload data in the single unit of payload data. Therefore, it is possible to make the reproduction/pause timing of a hold sound or audible sound within the time interval, at which the DSP takes in the RTP packet.

According to the present invention, the foregoing structure and operation make it possible to prevent increase in cost, when a hold sound or audible sound is reproduced in a VoIP terminal.

According to the present invention, the foregoing structure and operation make it possible to flexibly and arbitrarily select the hold sound and audible sound, which are differently required from user to user, from country to county or the like.

BRIEF DESCRIPTION OF THE DRAWINGS

FIGS. 20A and 20B are diagrams showing the reproduction timing of a hold sound and audible sound according to the eighth embodiment of the present invention;

DETAILED DESCRIPTION OF THE PREFERRED EMBODIMENTS

Figure 1:
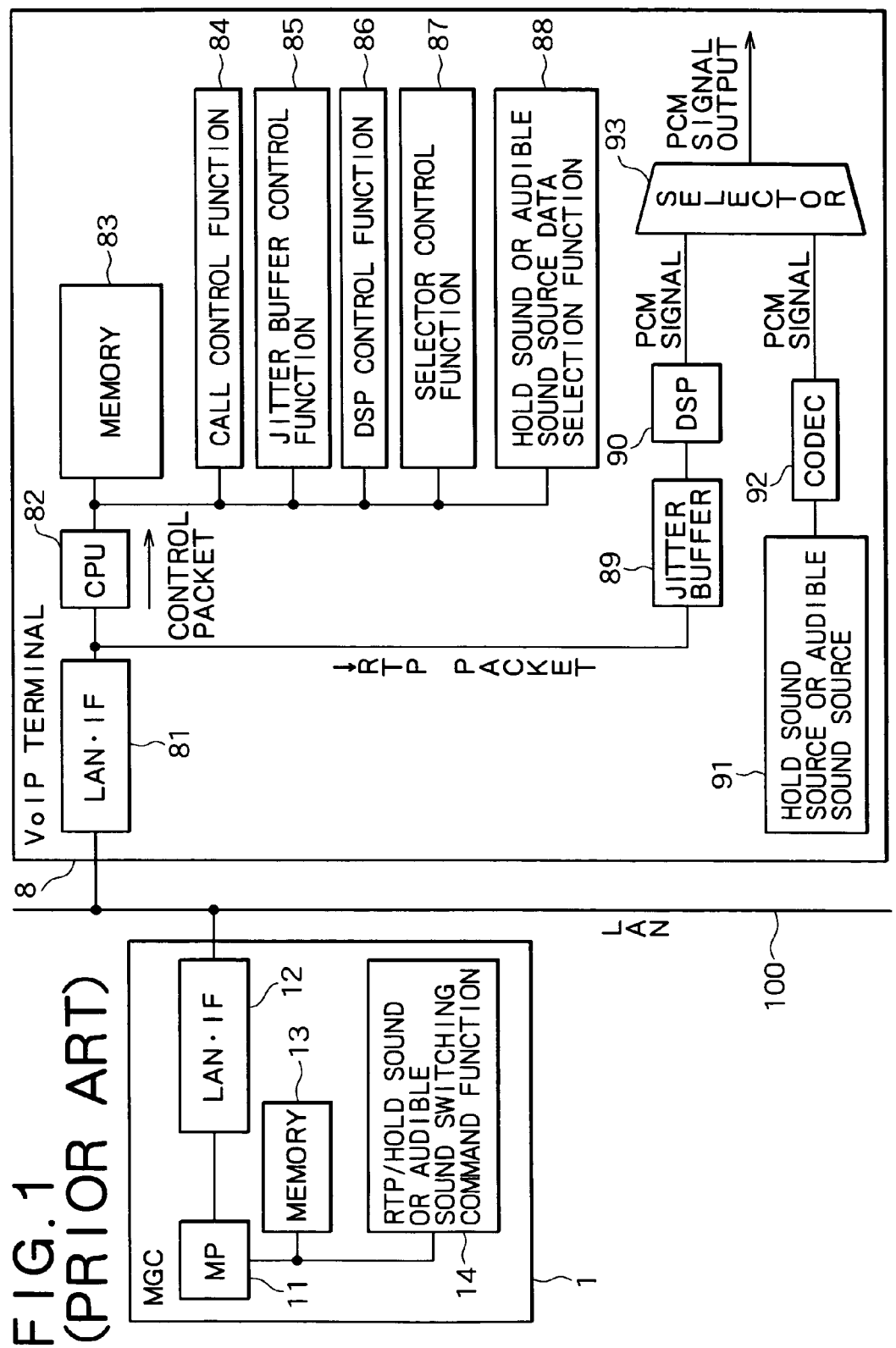
FIG. 1 is a block diagram showing the structure of a conventional IP telephony system.
Figure 2:
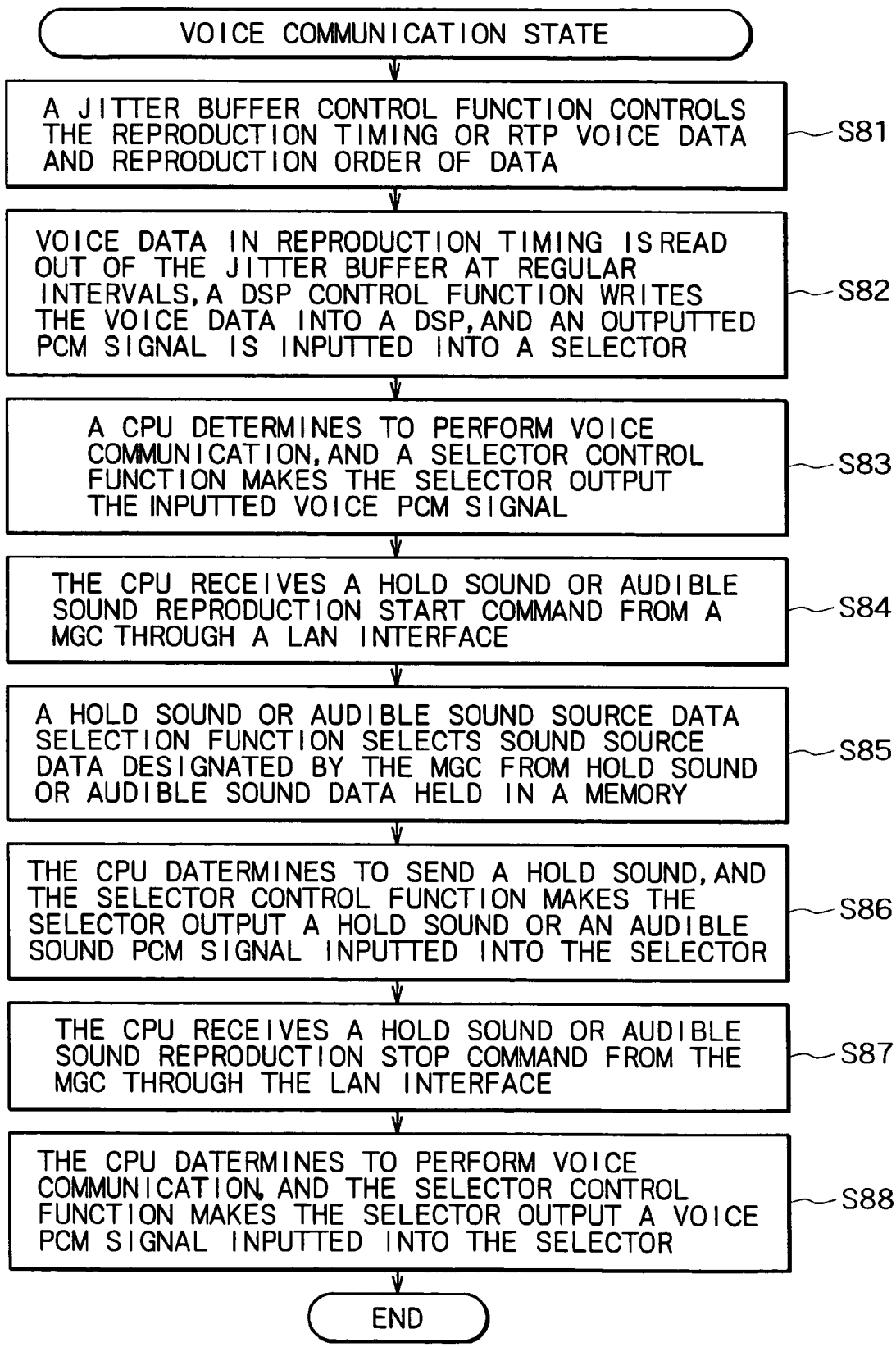
FIG. 2 is a flowchart showing the operation of a VoIP terminal of FIG. 1.
Figure 3:
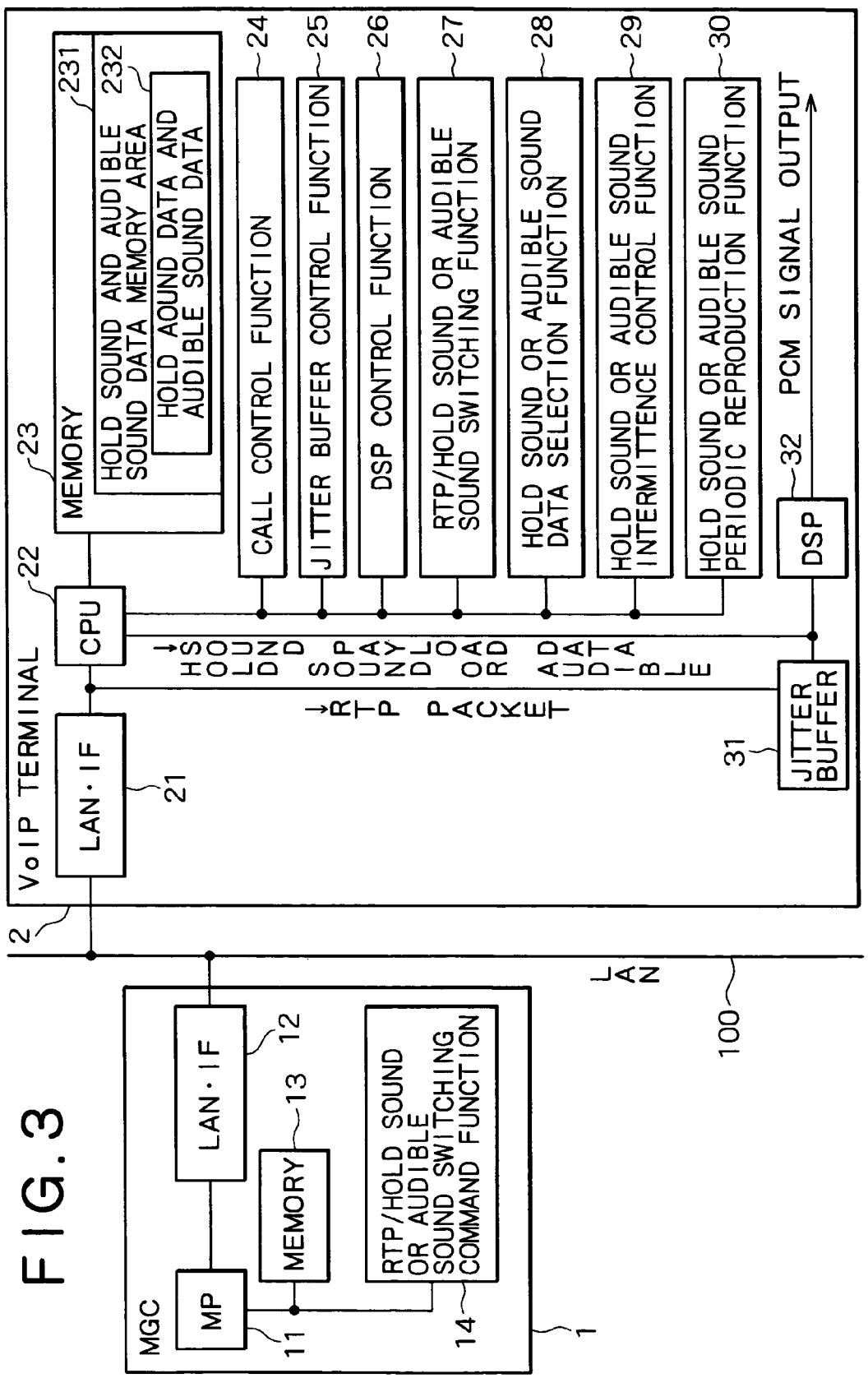
FIG. 3 is a block diagram showing the structure of an IP telephony system according to a first embodiment of the present invention.

Embodiments of the present invention will be described in detail with reference to the accompanying drawings. A first embodiment of the present invention will be first described. FIG. 3 is a block diagram showing the structure of an IP telephony system according to this embodiment. Referring to FIG. 3, the IP telephony system according to this embodiment comprises a MGC (Multimedia Gateway Controller) 1, a VoIP (Voice over Internet Protocol) terminal 2 such as a media gateway, a media converter, and an IP telephone, and a LAN (Local Area Network, such as Ethernet (R)) 100 for connecting the MGC 1 to the VoIP terminal 2.

The MGC 1 comprises at least a main processor (MP) 11, a LAN interface (LAN-IF) 12, a memory 13, and an RTP/hold sound or audible sound switching command function 14.

The VoIP terminal 2 at least comprises a LAN interface (LAN-IF) 21, a CPU (central processing unit) 22, a memory (a volatile memory such as, for example, an SDRAM (Synchronous Dynamic Random Access Memory)) 23, a call control function 24, a jitter buffer control function 25, a DSP (Digital Signal Processor) control function 26, an RTP (Real-time Transport Protocol)/hold sound or audible sound switching function 27, a hold sound or audible sound data selection function 28, a hold sound or audible sound intermittence control function 29, a hold sound or audible sound periodic reproduction function 30, a jitter buffer 31, and a DSP 32.

The memory 23 is provided with a hold sound and audible sound data memory area 231, in which hold sound data and audible sound data 232 are stored. Programs executed by the CPU 22 (programs executable by a computer) are stored in the memory 23, though they are not illustrated.

Figure 4:
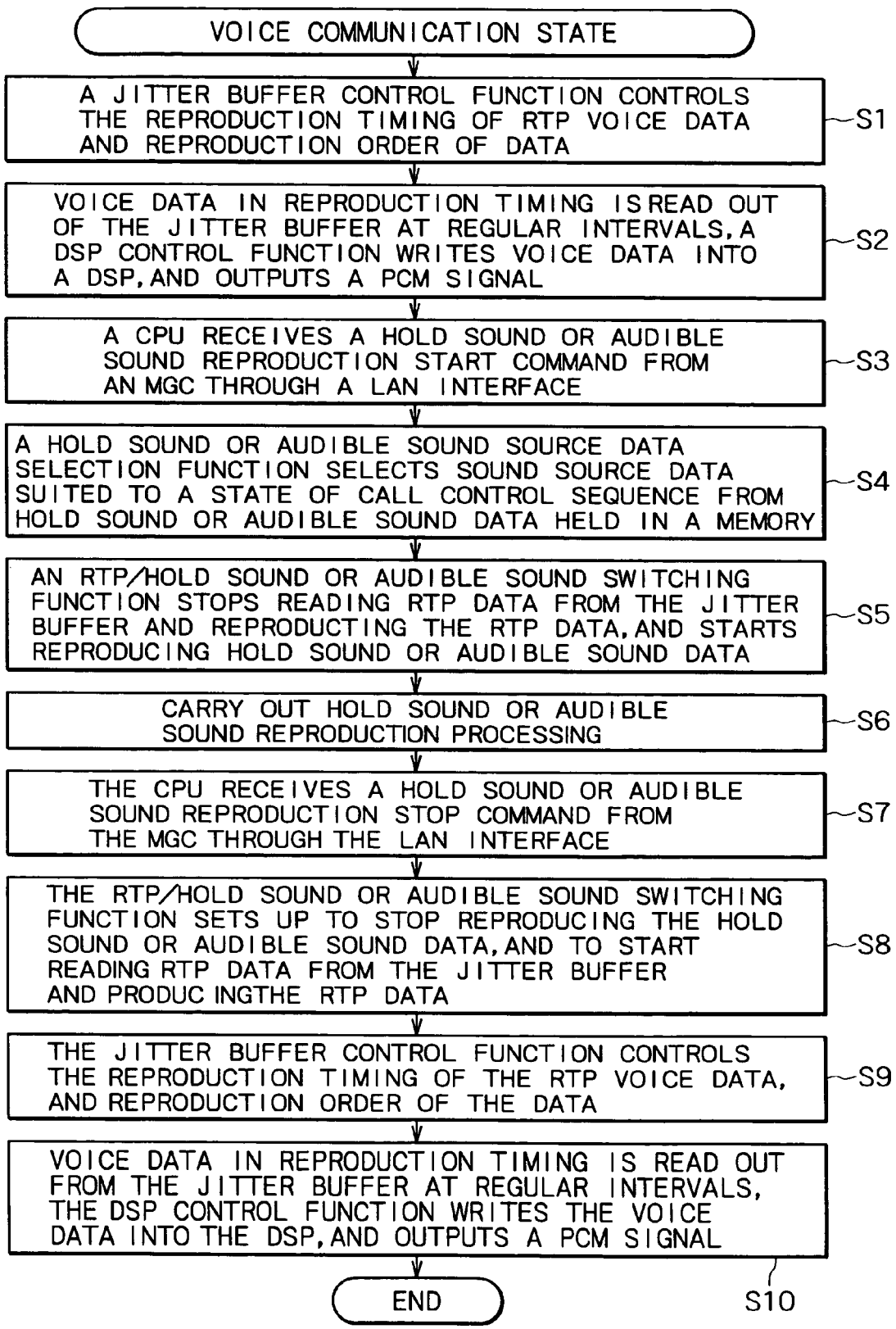
FIG. 4 is a flowchart showing the operation of a VoIP terminal of FIG. 3.
Figure 5:
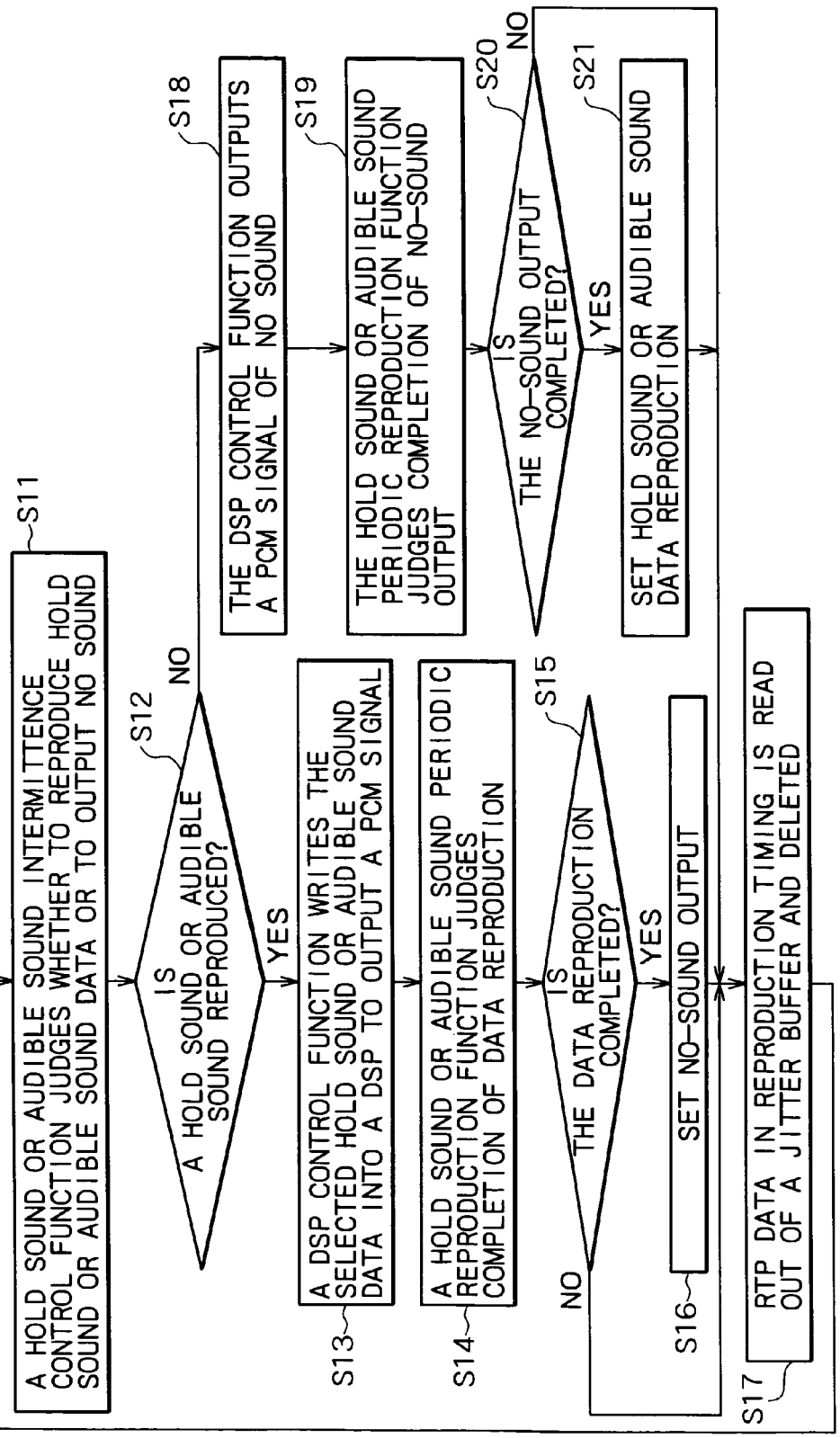
FIG. 5 is a flowchart showing the operation of hold sound and audible sound reproduction processing of FIG. 4.

FIG. 4 is a flowchart showing the operation of the VoIP terminal 2 of FIG. 3, and FIG. 5 is a flowchart showing the operation of hold sound or audible sound reproduction processing of FIG. 4. Referring to the FIGS. 3 to 5, the operation of the hold sound or audible sound reproduction processing by the VoIP terminal 2 will be described. In the following explanation, a flow in which the VoIP terminal 2, which has already carried out voice communication, sends out a hold sound will be described.

The CPU 22 of the VoIP terminal 2 stores a voice RTP packet, which is inputted through the LAN interface 21, on the jitter buffer 31 by use of the call control function 24, the jitter buffer control function 25, and the DSP control function 26. After the jitter buffer 31 absorbs the delay of a network, the RTP packet is written into the DSP 32 at regular intervals (for example, intervals of 10 ms). The DSP 32 converts the RTP packet into a voice PCM (Pulse Code Modulation) signal, and outputs it (a state of voice communication).

When a hold sound or an audible sound is reproduced in this state, the main processor 11 of the MGC 1 issues an RTP/hold sound or audible sound reproduction start command to the VoIP terminal 2 by using the RTP/hold sound or audible sound switching command function 14 and the LAN interface 12.

Upon receiving the RTP/hold sound or audible sound reproduction start command from the MGC 1 through the LAN interface 21, the call control function 24 of the VoIP terminal 2 transfers the contents of the RTP/hold sound or audible sound reproduction start command to the hold sound or audible sound data selection function 28. The hold sound or audible sound data selection function 28 selects sound source data suited to a state on a call control sequence (the hold sound in this case) from the hold sound and audible sound data 232, which is stored on the hold sound and audible sound data memory area 231 of the memory 23 in a payload format of the RTP packet (steps S3 and S4 of FIG. 4).

When the sound source data is selected, the call control function 24 stops reading the RTP data from the jitter buffer 31 and writing it into the DSP 32 in response to the RTP/hold sound or audible sound reproduction start command received from the MGC 1 by use of the RTP/hold sound or audible sound switching function 27. Thus, the call control function 24 stops reproducing the voice PCM signal, and starts reproducing the hold sound or audible sound (step S5 of FIG. 4).

Then, the CPU 22 shifts to hold sound or audible sound reproduction processing (step S6 of FIG. 4). The hold sound or audible sound intermittence control function 29 determines whether to reproduce the selected sound source data (hold sound or audible sound data) or to output no sound (step S11 of FIG. 5).

When the CPU 22 determines to reproduce the hold sound (step S12 of FIG. 5), the CPU 22 writes the selected sound source data (the hold sound) in the payload format of the RTP packet into the DSP 32 by using the DSP control function 26, to make the DSP 32 output a PCM signal of the hold sound (step S13 of FIG. 5).

When the sound source data in an RTP packet format is written on a single occasion, the CPU 22 judges whether or not the reproduction of the sound source data is completed by using the hold sound or audible sound periodic reproduction function 30 (step S14 of FIG. 5). If the reproduction of the sound source data is completed (step S15 of FIG. 5), the CPU 22 sets no-sound output (step S16 of FIG. 5), and shifts to processing inside the jitter buffer 31. If the reproduction of the sound source data is not completed (the step S15 of FIG. 5), the CPU 22 shifts to the processing inside the jitter buffer 31 without setting no-sound output.

The hold sound or audible sound intermittence control function 29 determines whether to reproduce the sound source data (hold sound or audible sound data) or to output no sound. If no-sound output is determined (step S12 of FIG. 5), the CPU 22 pauses writing the selected sound source data into the DSP 32, and makes the DSP 32 output a PCM signal of no-sound by use of the DSP control function 26 (step S18 of FIG. 5).

After completing this processing, the CPU 22 judges whether or not the output of no sound is completed by using the hold sound or audible sound periodic reproduction function 30 (step S19 of FIG. 5). If the output is completed (step S20 of FIG. 5), the CPU 22 sets the reproduction of the hold sound or audible sound data (step S21 of FIG. 5), and then shifts to the processing inside the jitter buffer 31. If the output is not completed (step S20 of FIG. 5), the CPU 22 shifts to the processing inside the jitter buffer 31 without setting the reproduction of the hold sound or audible sound data.

As the processing inside the jitter buffer 31, the CPU 22 reads the voice RTP packet data, which is on reproduction timing in the jitter buffer 31, from the jitter buffer 31 to delete it (step S17 of FIG. 5), when the sound source data (hold sound or audible sound data) is not reproduced. Then, the operation returns to a start of the hold sound or audible sound reproduction processing (the pattern reproduction of the sound source data and the no-sound output).

In receiving an RTP/hold sound or audible sound reproduction stop command from the MGC 1 through the LAN interface 21 with arbitrary timing after receiving the RTP/hold sound or audible sound reproduction start command (step S7 of FIG. 4), the call control function 24 of the VoIP terminal 2 stops the hold sound or audible sound reproduction processing by using the RTP/hold sound or audible sound switching function 27. Then, the call control function 24 starts reading the RTP data out of the jitter buffer 31 and writing it into the DSP 32, in order to start reproducing the voice PCM signal (steps S8 to S10 of FIG. 4).

According to this embodiment, as described above, in the VoIP terminal 2, a plurality of types of hold sound and audible sound data are stored on the memory 23 in the payload format of the RTP packet. The hold sound or audible sound data to be reproduced is selected from the plurality of types of hold sound and audible sound data in accordance with a state of call control, and written into the DSP 32 as the RTP packet. Thus, a memory for the hold sound source and audible sound source, a selector, a CODEC, and hardware as a peripheral circuit thereof dedicated for the reproduction of the hold sound and audible sound are unnecessary, so that it is possible to reduce the cost of a device.

Then, a second embodiment of the present invention will be described.

Figure 6:
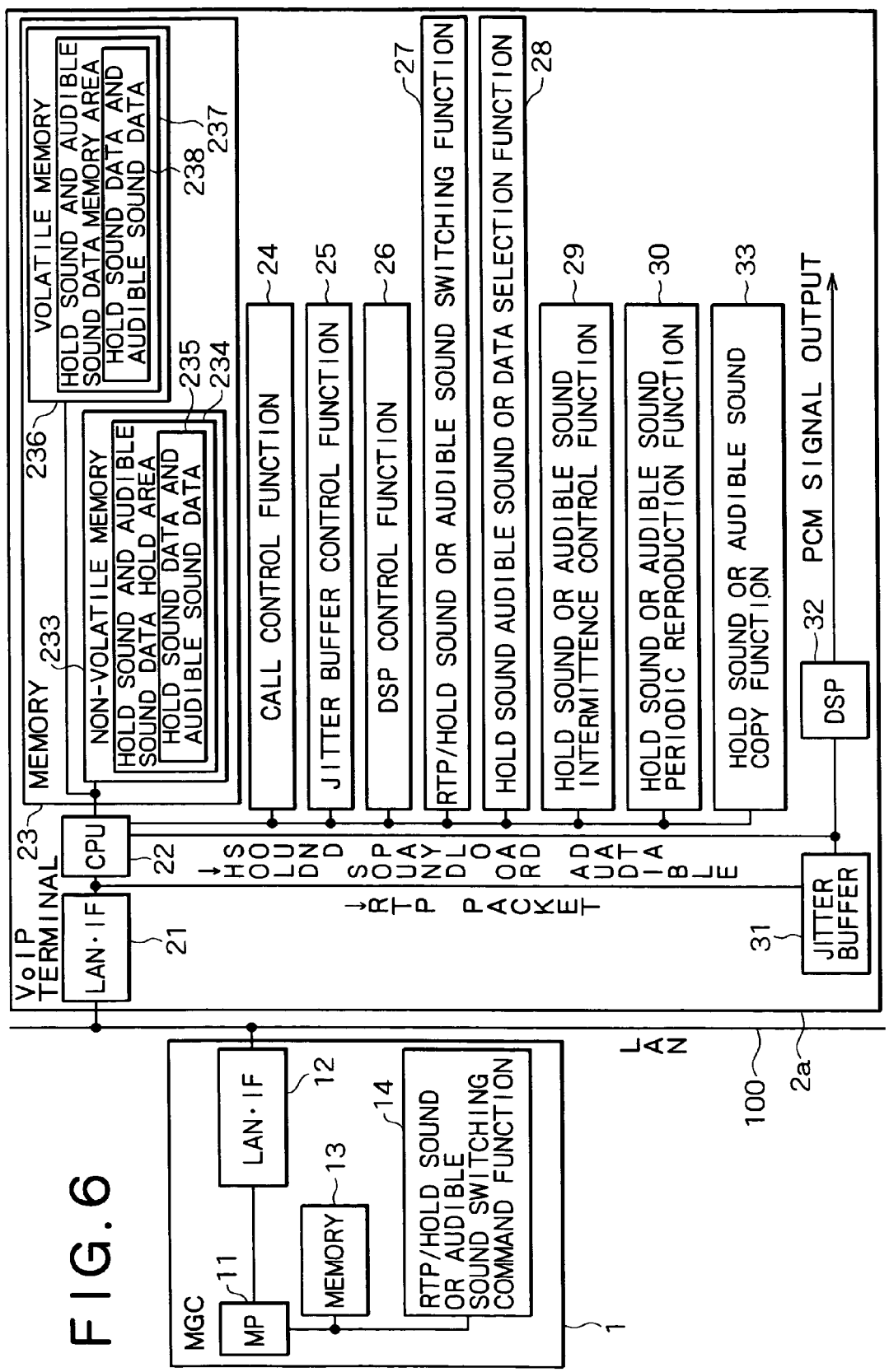
FIG. 6 is a block diagram showing the structure of an IP telephony system according to a second embodiment of the present invention.

FIG. 6 is a block diagram showing the structure of an IP telephony system according to this embodiment. Referring to FIG. 6, the IP telephony system according to this embodiment has the same structure as the IP telephony system of FIG. 3 according to the first embodiment, except that a hold sound or audible sound copy function 33 is added to a VoIP terminal 2a, and a memory 23 comprises a non-volatile memory (for example, a FROM (Flash Read Only Memory)) 233, and a volatile memory (for example, an SDRAM) 236. The same reference numbers as the first embodiment refer to identical components.

The non-volatile memory 233 is provided with a hold sound and audible sound data hold area 234, on which hold sound data and audible sound data 235 are stored. The volatile memory 236 is provided with a hold sound and audible sound data memory area 237, on which hold sound data or audible sound data 238 is stored.

The hold sound or audible sound copy function 33 of the VoIP terminal 2a copies the hold sound data or audible sound data 235 held by the hold sound and audible sound data hold area 234 of the non-volatile memory 233 into the hold sound and audible sound data memory area 237 of the volatile memory 236.

This embodiment differs from the first embodiment in that a hold sound or an audible sound can be reproduced with the use of the hold sound data or audible sound data 238 copied into the hold sound and audible sound data memory area 237, but the other respects are the same as those of the first embodiment.

The memory access speed of the non-volatile memory 233 is generally slower than that of the volatile memory 236. Accordingly, in this embodiment, hold sound or audible sound reproduction processing is carried out by using the hold sound data or audible sound data 238, which is copied from the hold sound data and audible sound data 235 held in the hold sound and audible sound data hold area 234 of the non-volatile memory 233 into the hold sound and audible sound data memory area 237 of the volatile memory 236. Increase in the memory access speed causes reduction in a processing load in reproducing the hold sound or audible sound.

Figure 7:
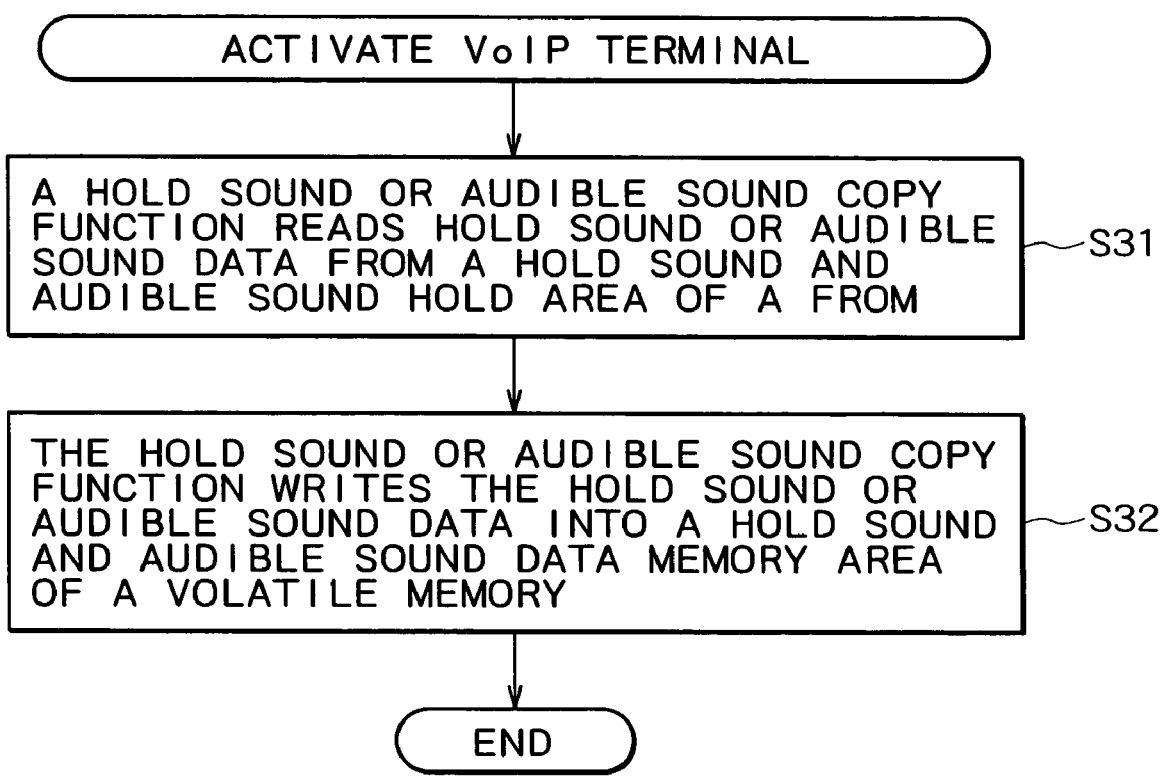
FIG. 7 is a flowchart showing the operation of a VoIP terminal of FIG. 6.

FIG. 7 is a flowchart showing the operation of the VoIP terminal 2a of FIG. 6. Referring to FIGS. 6 and 7, the operation of the hold sound or audible sound reproduction processing according to this embodiment will be described. In the following explanation, a flow in a case that the VoIP terminal 2a is in a stop state will be described.

When the VoIP terminal 2a is activated, the CPU 22 reads out the hold sound data or audible sound data 235 held by the hold sound and audible sound data hold area 234 of the non-volatile memory 233 by use of the hold sound or audible sound copy function 33 (step S31 of FIG. 7), to write the hold sound or audible sound data 235 into the hold sound and audible sound data memory area 237 of the volatile memory 236 as the hold sound data or audible sound data 238 (step S32 of FIG. 7).

By using the hold sound data or audible sound data 238 copied into this hold sound and audible sound data memory area 237, the hold sound or audible sound reproduction processing similar to that of the foregoing first embodiment of the present invention will be carried out in this embodiment.

In this embodiment, as described above, the non-volatile memory 233, which generally has the slow memory access speed, is used as a memory area for storing the hold sound and audible sound data, and the volatile memory 236, which generally has the fast memory access speed, is used as a memory for reproducing the hold sound or audible sound data. Therefore, increase in the memory access speed in reproducing the hold sound or audible sound makes it possible to reduce a processing load in reproducing the hold sound or audible sound.

Next, a third embodiment of the present invention will be described.

Figure 8:
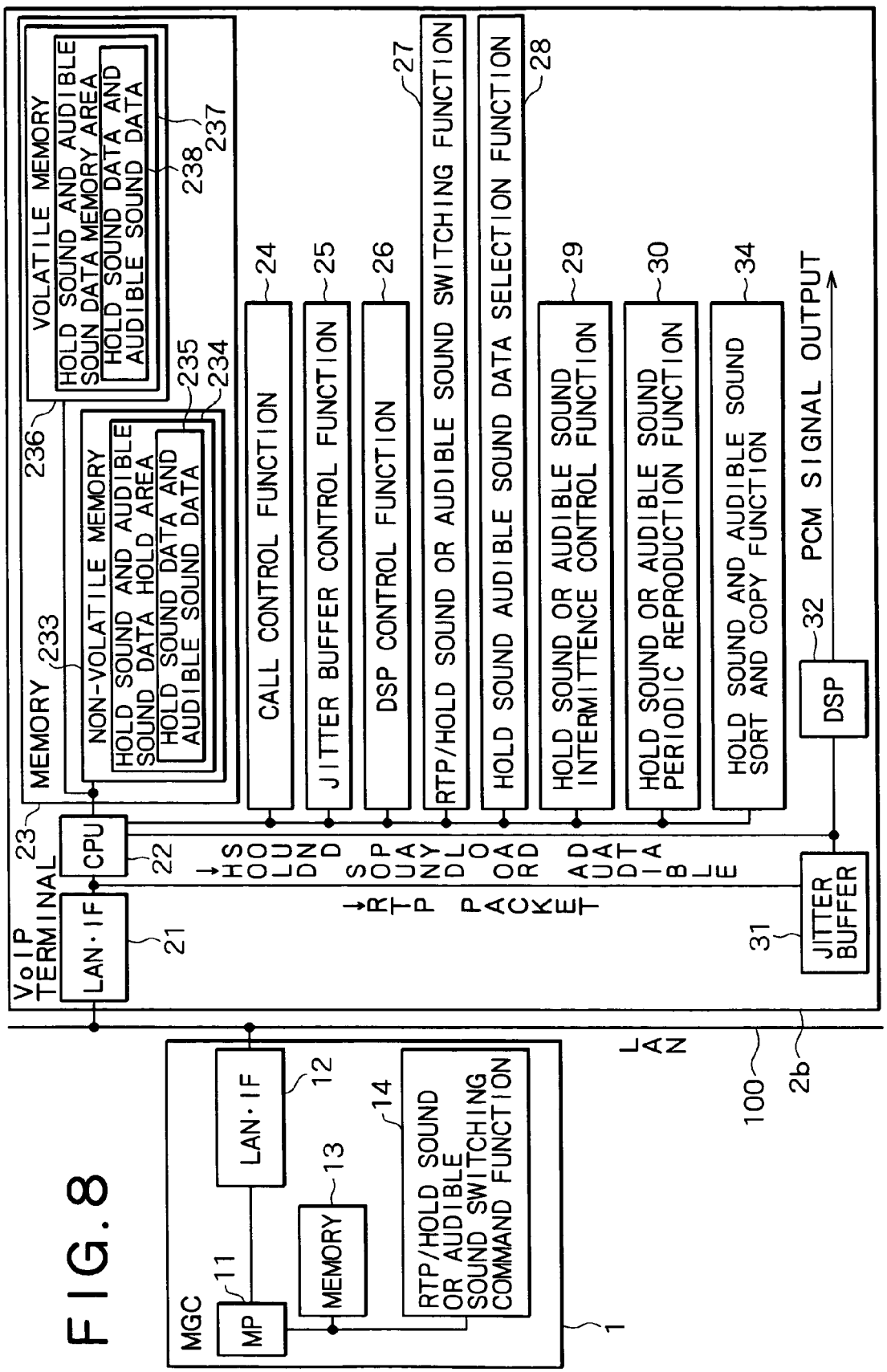
FIG. 8 is a block diagram showing the structure of an IP telephony system according to a third embodiment of the present invention.

FIG. 8 is a block diagram showing the structure of an IP telephony system according to this embodiment. Referring to FIG. 8, the IP telephony system according to this embodiment has the same structure as the IP telephony system of FIG. 6 according to the second embodiment, except that a VoIP terminal 2b has a hold sound and audible sound sort and copy function 34 instead of the hold sound or audible sound copy function 33. The same reference numbers as the second embodiment refer to identical components.

This embodiment differs from the second embodiment in that a plurality of types of hold sound and audible sound data 235 are stored on a hold sound and audible sound data hold area 234 of a non-volatile memory 233 of the VoIP terminal 2b, and arbitrary hold sound and audible sound data is sorted out from the plurality of types of hold sound and audible sound data 235 on the basis of each of information organized by country, information specific to a user, and information about a PCM code rule upon activating the VoIP terminal 2b, and is copied into a hold sound data and audible sound data memory area 237 in a volatile memory 236 as hold sound and audible sound data 238. The other respects, however, are the same as those of the foregoing second embodiment.

In this embodiment, one pair of hold sound and audible sound data is arbitrarily sorted out from the plurality of types of hold sound and audible sound data 235 held by the hold sound and audible sound data hold area 234 of the non-volatile memory 233 on the basis of the information organized by country, the information specific to the user, and the information about the PCM code rule, and the pair of hold sound and audible sound is copied into the hold sound and audible sound data memory area 237 in the volatile memory 236 as the hold sound and audible sound data 238 to carry out the reproduction processing of a hold sound or an audible sound by using it. Therefore, it is possible to minimize a hold sound and audible sound data memory area in the volatile memory 236.

Figure 9:
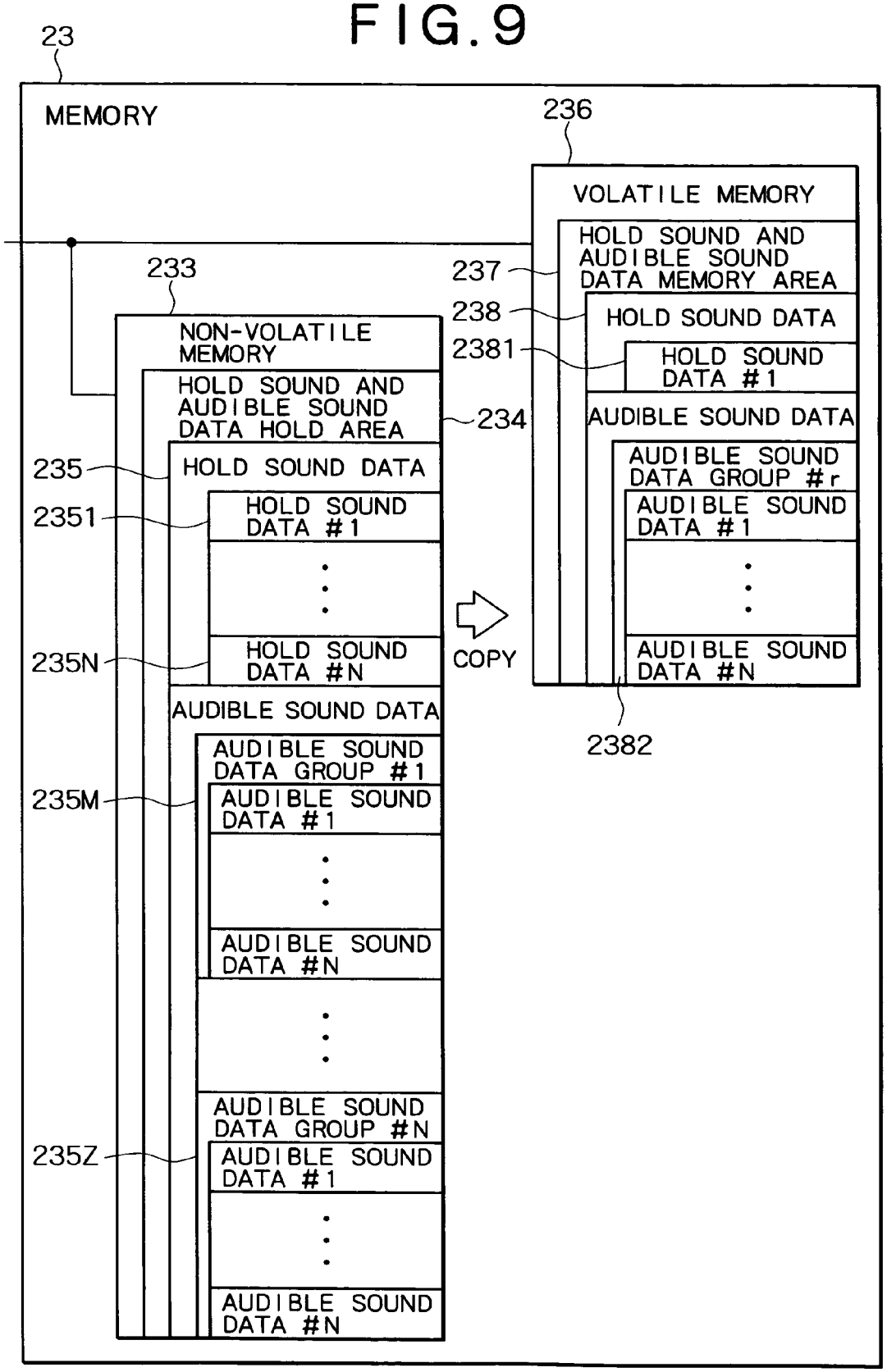
FIG. 9 is a block diagram showing the detailed structure of a memory of FIG. 8.

FIG. 9 is a block diagram showing the detailed structure of a memory 23 of FIG. 8. Referring to FIG. 9, a plurality of types of data such as hold sound data 2351 to 235N and audible sound data groups 235M to 235Z are held by the hold sound and audible sound data hold area 234 of the non-volatile memory 233 of the memory 23.

The hold sound and audible sound data 238 copied into the hold sound and audible sound data memory area 237 of the volatile memory 236 is composed of hold sound data 2381 and an audible data group 2382.

Figure 10:
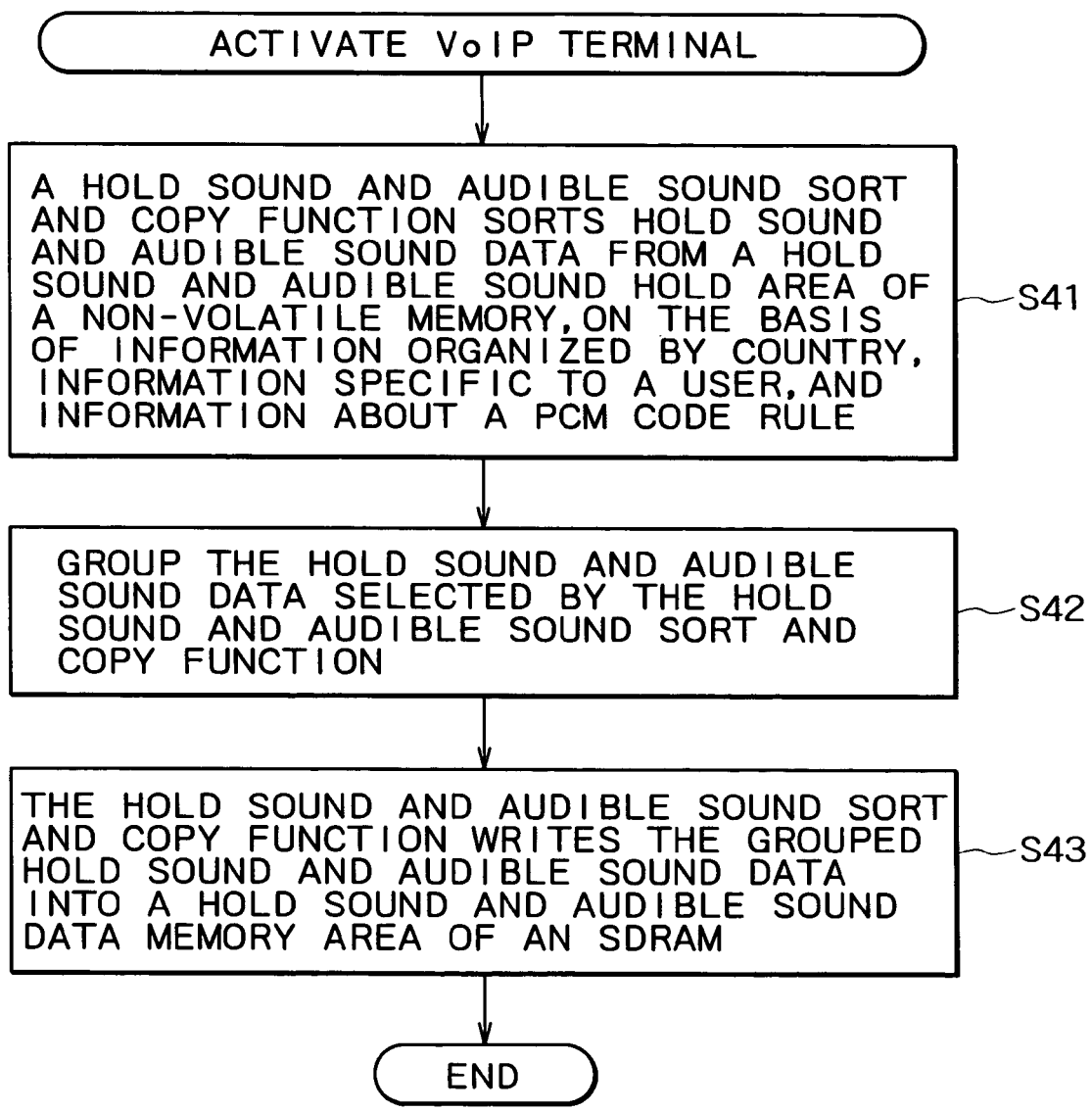
FIG. 10 is a flowchart showing the operation of a VoIP terminal of FIG. 8.

FIG. 10 is a flowchart showing the operation of the VoIP terminal 2b of FIG. 8. The operation of the hold sound or audible sound reproduction processing according to this embodiment will be described with reference to FIGS. 8 to 10. In the following explanation, a flow in a case that the VoIP terminal 2b is started from a stop state will be described.

When the VoIP terminal 2b is activated, the CPU 22 sorts out arbitrary hold sound and audible sound data from the plurality of types of hold sound and audible sound data 235, which are held by the hold sound and audible sound data hold area 234 of the non-volatile memory 233, with the use of the hold sound and audible sound sort and copy function 34 on the basis of the information organized by country, the information specific to the user, and the information about the PCM code rule (step S41 of FIG. 10).

Then, the hold sound and audible sound sort and copy function 34 groups the sorted out pair of hold sound and audible sound data (step S42 of FIG. 10), and copies it into the hold sound and audible sound data memory area 237 of the volatile memory 236 as the hold sound and audible sound data 238 (step S43 of FIG. 10).

This embodiment differs from the second embodiment in that the hold sound or audible sound can be reproduced by using the hold sound data and audible sound data 238 (hold sound data 2381 and the audible sound data group 2382) copied into the hold sound and audible sound data memory area 237, but the other respects are the same as those of the foregoing second embodiment.

In this embodiment, as described above, the VoIP terminal 2b has the information organized by country, the information specific to the user, and the information about the PCM code rule, and one pair of hold sound and audible sound data is sorted out from the plurality of types of hold sound and audible sound data 235 held by the non-volatile memory 233 on the basis of the information. The pair of hold sound and audible sound data is copied from the non-volatile memory 233 into the volatile memory 236, so that it is possible to minimize the hold sound and audible sound data memory area 237 in the volatile memory 236.

Then, a fourth embodiment of the present invention will be described.

Figure 11:
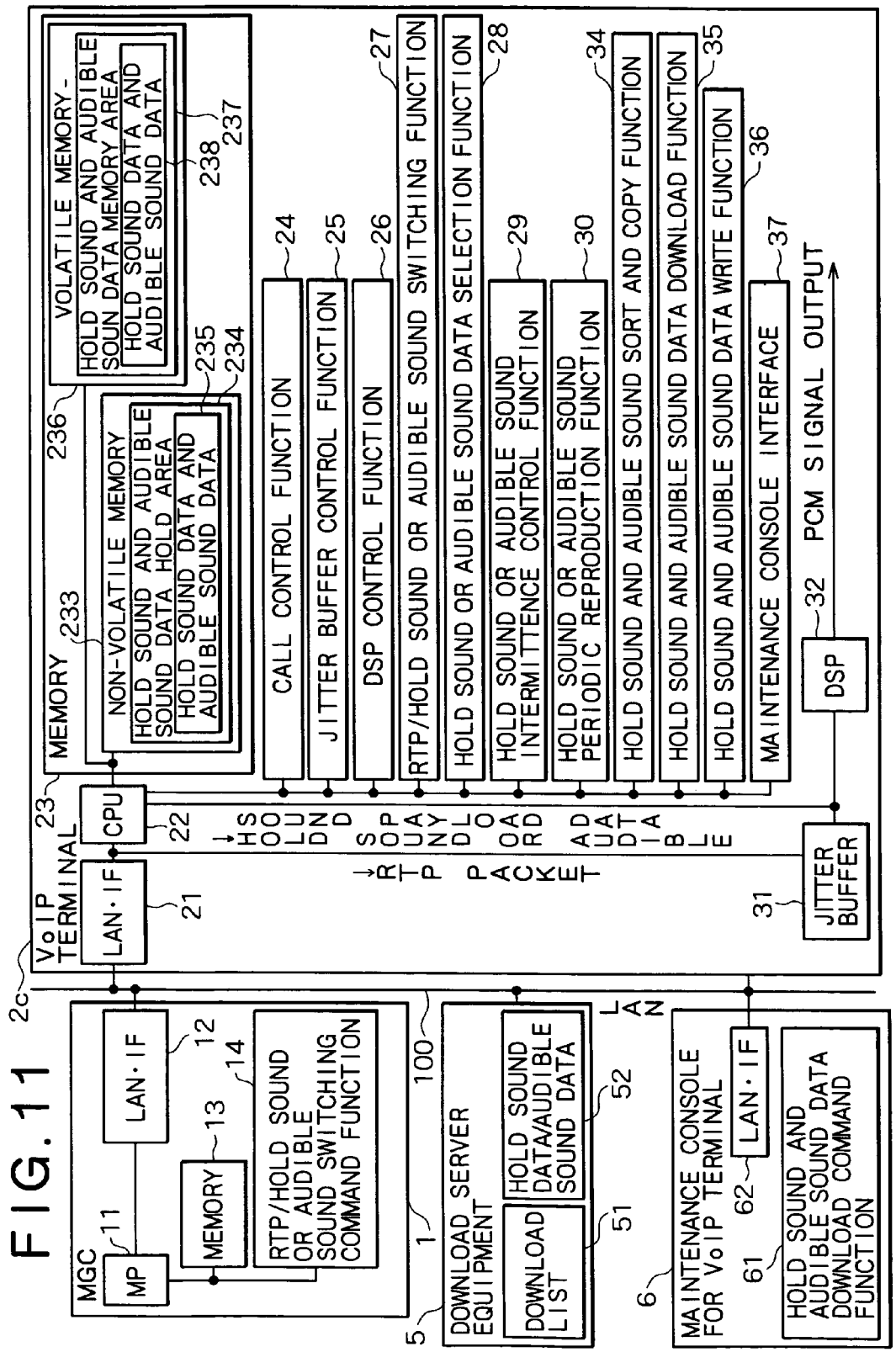
FIG. 11 is a block diagram showing the structure of an IP telephony system according to a fourth embodiment of the present invention.

FIG. 11 is a block diagram showing the structure of an IP telephony system according to this embodiment. Referring to FIG. 11, the IP telephony system according to this embodiment has the same structure as the IP telephony system of FIG. 8 according to the third embodiment, except that a hold sound and audible sound data download function 35, and a hold sound and audible sound data write function 36 and a maintenance console interface 37 are added to a VoIP terminal 2c, and down load server equipment 5 and a maintenance console 6 for the VoIP terminal are connected to a LAN 100. The same reference numbers as the third embodiment refer to identical components.

The download server equipment 5 is at least provided with a download list 51 and all of hold sound data and audible sound data 52 listed in the download list 51. The maintenance console 6 for the VoIP terminal starts downloading data from the download server equipment 5 to the VoIP terminal 2c.

This embodiment differs from the third embodiment in that hold sound data and audible sound data 235 held by a hold sound and audible sound data hold area 234 of a non-volatile memory 233 of the VoIP terminal 2c is rewritable into data downloaded from the download server equipment 5 in response to activation by the maintenance console 6 for the VoIP terminal, but the other respects are the same as those of the foregoing third embodiment.

In this embodiment, since the hold sound data and audible sound data 235 held by the hold sound and audible sound data hold area 234 of the non-volatile memory 233 is rewritten into the data downloaded from the download server equipment 5 in response to activation by the maintenance console 6 for the VoIP terminal, it is possible to easily change the hold sound and audible sound data 235.

Figure 12:
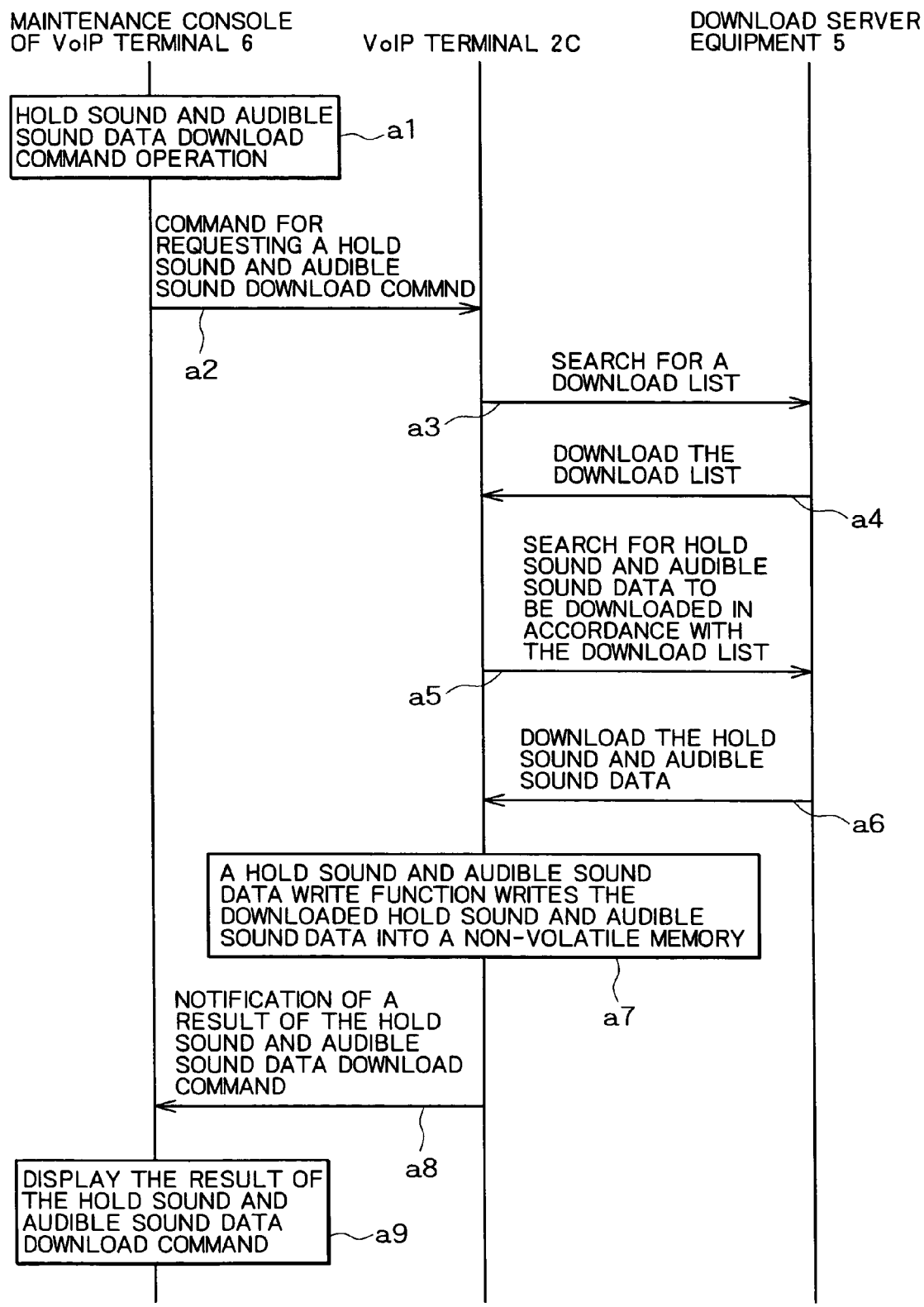
FIG. 12 is a sequence chart showing the operation of the IP telephony system according to the fourth embodiment of the present invention.

FIG. 12 is a sequence chart showing the operation of the IP telephony system according to this embodiment. The operation of hold sound or audible sound reproduction processing according to this embodiment will be described with reference to FIGS. 11 and 12. In the following explanation, a flow in a case that the VoIP terminal 2c is in an operating state will be described.

When the hold sound and audible sound data is downloaded from the download server equipment 5, an administrator commands the VoIP terminal 2c to download the hold sound and audible sound data by using a hold sound and audible sound data download command function 61 of the maintenance console 6 for the VoIP terminal through a LAN interface 62 (a1 and a2 of FIG. 12).

In receiving a hold sound and audible sound data download command from the maintenance console 6 for the VoIP terminal 2c through the LAN interface 21, the maintenance console interface function 37 of the CPU 22 of the VoIP terminal 2c transfers the hold sound and audible sound data download command to the hold sound and audible sound data download function 35.

The hold sound and audible sound data download function 35 searches through the download server equipment 5 for the download list 51, and downloads the download list 51 from the download server equipment 5 through the LAN interface 21 (a3 and a4 of FIG. 12). Then, the hold sound and audible sound data download function 35 searches through the download server equipment 5 for all files of hold sound and audible sound data designated by the downloaded download list 51, and downloads the all files from the download server equipment 5 through the LAN interface 21 (a5 and a6 of FIG. 12).

The hold sound and audible sound data write function 36 of the VoIP terminal 2c writes all of the hold sound and audible sound data, which are downloaded through the LAN interface 21, into the hold sound and audible sound data hold area 234 of the non-volatile memory 233 as hold sound data and audible sound data 235 (a7 of FIG. 12). The VoIP terminal 2c informs the maintenance console 6 for the VoIP terminal of a result of downloading the hold sound data and audible sound data 235 (a8 of FIG. 12), so that the maintenance console 6 for the VoIP terminal displays a result of a hold sound data and audible sound data download command (a9 of FIG. 12).

This embodiment differs from the third embodiment in that the hold sound data and audible sound data 235 are downloaded into the hold sound and audible sound data hold area 234 of the non-volatile memory 233, but the other respects are the same as those of the foregoing third embodiment.

In this embodiment, as described above, the VoIP terminal 2c writes the plurality of types of hold sound and audible sound data stored on the download server equipment 5 into the hold sound and audible sound data hold area 234 of the non-volatile memory 233 in the VoIP terminal, in response to the activation by the maintenance console 6 for the VoIP terminal. Therefore, since hold sound or audible sound data 238 stored on the volatile memory 236 is arbitrarily changeable, it is possible to flexibly meet user's needs.

Next, a fifth embodiment of the present invention will be described.

Figure 13:
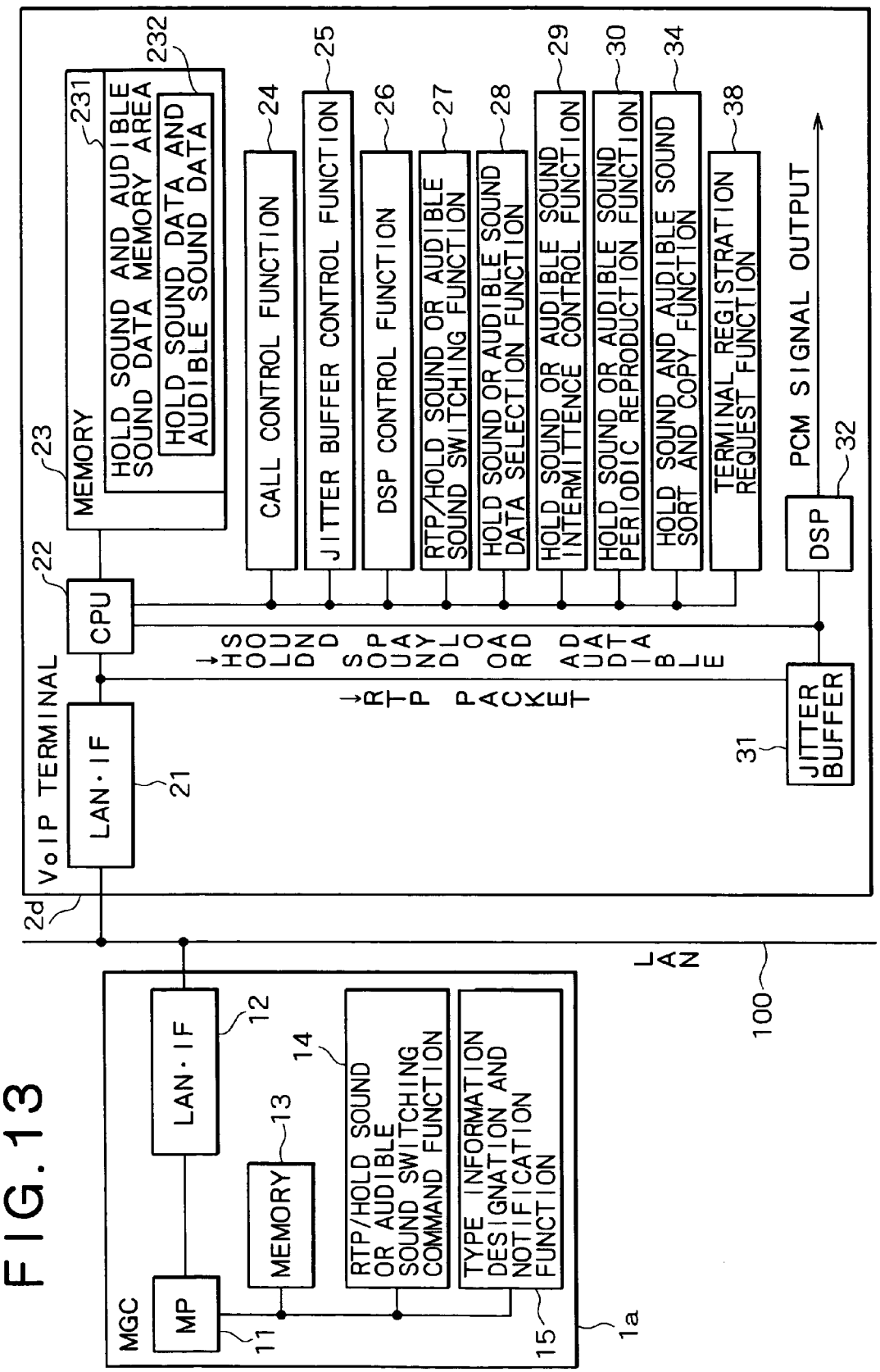
FIG. 13 is a block diagram showing the structure of an IP telephony system according to a fifth embodiment of the present invention.

FIG. 13 is a block diagram showing the structure of an IP telephony system according to this embodiment. Referring to FIG. 13, the IP telephony system according to this embodiment has the same structure as the IP telephony system of FIG. 8 according to the third embodiment, except that a terminal registration request function 38 is added to a VoIP terminal 2d and a type information designation and notification function 15 is added to an MGC 1a, to determine hold sound and audible sound data used in the VoIP terminal 2d in accordance with type information designation from the MGC 1a. The same reference numbers as the third embodiment refer to identical components.

In this embodiment, the MGC 1a, being a higher-level device in performing call control in the IP telephony system, determines a type of hold sound and audible sound data used in the VoIP terminal 2d being a lower-level device, to unify the type of hold sound and audible sound data in the IP telephony system.

Figure 14:
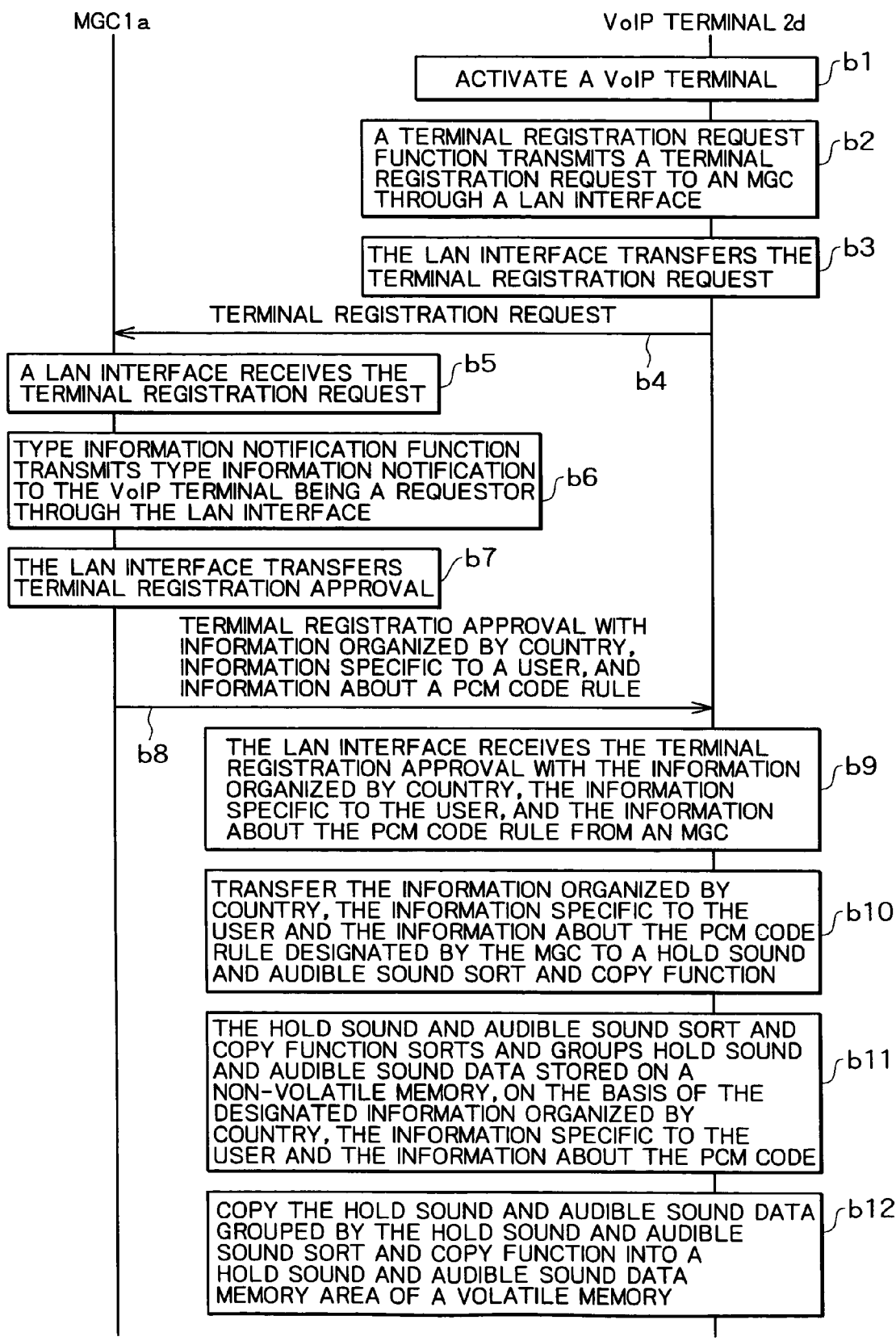
FIG. 14 is a sequence chart showing the operation of a VoIP terminal of FIG. 13.

FIG. 14 is a sequence chart showing the operation of the VoIP terminal 2d of FIG. 13. The operation of hold sound or audible sound reproduction processing according to this embodiment will be described with reference to FIGS. 13 and 14. In the following explanation, a flow in a case that the VoIP terminal 2d is started from a stop state will be described.

When the VoIP terminal 2d is started (b1 of FIG. 14), a CPU 22 requests the MGC 1a to register the terminal by use of the terminal registration request function 38 through a LAN interface 21 (b2 to b4 of FIG. 14).

Upon receiving a terminal registration request from the VoIP terminal 2d through the LAN interface 12 (b5 of FIG. 14), a main processor 11 of the MGC 1a informs the VoIP terminal 2d of a terminal registration approval, to which information organized by country, information specific to a user, and information about a PCM code rule is added, by using the type information designation and notification function 15 through a LAN interface 12 (b6 to b8 of FIG. 14).

Upon receiving the terminal registration approval from the MGC 1a through the LAN interface 21 (b9 of FIG. 14), the terminal registration request function 38 of the VoIP terminal 2d transfers the information organized by country, the information specific to the user, and the information about the PCM code rule designated by the MGC 1a to a hold sound and audible sound sort and copy function 34 (b10 of FIG. 14).

The hold sound and audible sound sort and copy function 34 sorts and groups a pair of arbitrary hold sound and audible sound data from a plurality of types of hold sound and audible sound data 235 held by a hold sound and audible sound data hold area 234 of a non-volatile memory 233 on the basis of the information organized by country, the information specific to the user and the information about the PCM code rule (b11 of FIG. 14). Then, the hold sound and audible sound sort and copy function 34 copies the sorted hold sound and audible sound data into a hold sound and audible sound data memory area 237 in a volatile memory 236 as hold sound and audible sound data 238 (b12 of FIG. 14).

This embodiment differs from the third embodiment in that a hold sound or audible sound can be reproduced by using the hold sound data and audible sound data 238 (hold sound data 2381 and an audible sound data group 2382), which are designated by the MGC 1a and copied into the hold sound and audible sound data memory area 237, but the other respects are the same as those of the foregoing third embodiment.

In this embodiment, as described above, the MGC 1a informs the VoIP terminal 2d of the information organized by country, the information specific to the user, and the information about the PCM code rule in activating the VoIP terminal 2d, in order to designate the type of hold sound and audible sound data used in the VoIP terminal 2d. Therefore, it is possible to unify the type of hold sound and audible sound in the IP telephony system.

Next, a sixth embodiment of the present invention will be described.

Figure 15:
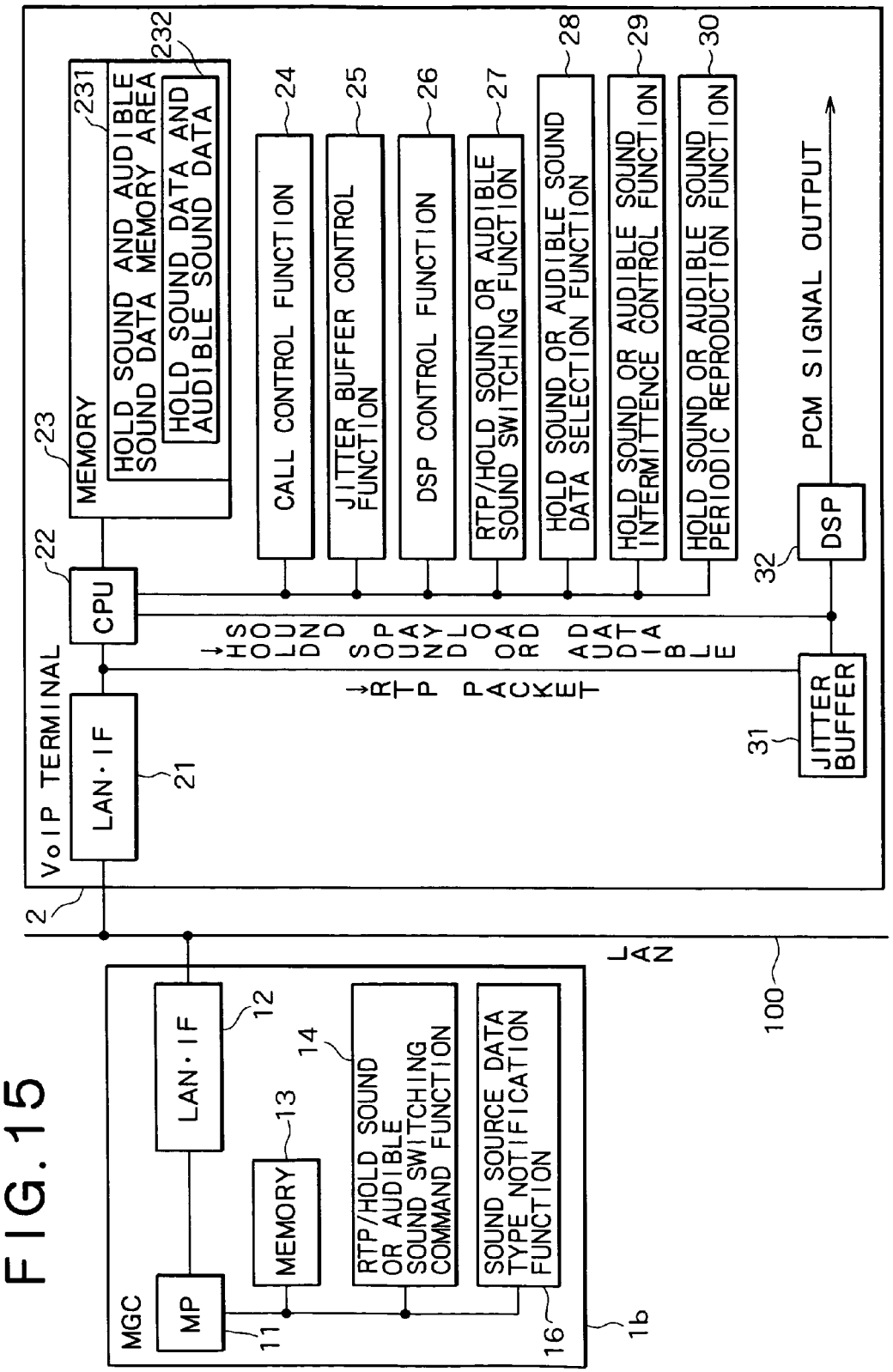
FIG. 15 is a block diagram showing the structure of an IP telephony system according to a sixth embodiment of the present invention.

FIG. 15 is a block diagram showing the structure of an IP telephony system according to this embodiment. Referring to FIG. 15, the IP telephony system according to this embodiment has the same structure as the IP telephony system of FIG. 3 according to the first embodiment, except that a sound source data type notification function 16 is so added to a MGC 1b that a VoIP terminal 2 can determine hold sound or audible sound data to be reproduced on the basis of a sound source data type notification from the MGC 1b. The same reference numbers as the first embodiment refer to identical components.

According to this embodiment, in the IP telephony system, the MGC 1b, being a higher-level device in performing call control, determines a type of hold sound or audible sound data to be reproduced in the VoIP terminal 2 being a lower-level device in accordance with each state of the call control, and informs the VoIP terminal 2 of the type. Therefore, the VoIP terminal 2 can determine the type of hold sound or audible sound data to be reproduced without judging a call state.

Figure 16:
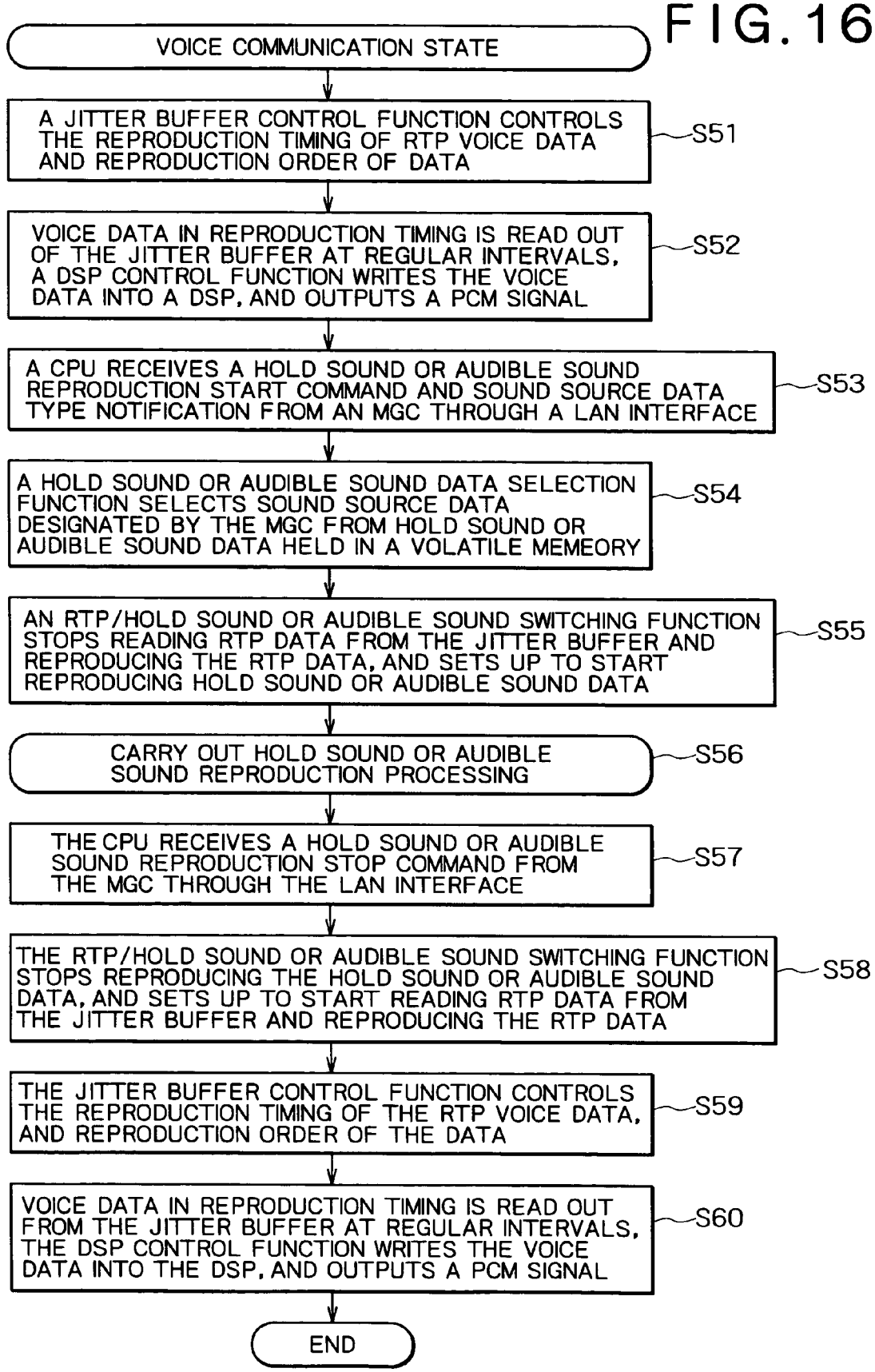
FIG. 16 is a flowchart showing the operation of a VoIP terminal of FIG. 15.

FIG. 16 is a flowchart showing the operation of the VoIP terminal 2 of FIG. 15. The operation of hold sound and audible sound reproduction processing according to this embodiment will be described with reference to FIGS. 15 and 16. In the following explanation, a flow in a case that the VoIP terminal 2 is in a voice communication state will be described. The operation of this voice communication state (steps S51 and S52 of FIG. 16) is the same as the operation according to the foregoing first embodiment, so that the description thereof will be omitted.

To reproduce a hold sound or an audible sound in the VoIP terminal 2 in accordance with a state of the call control, a main processor 11 of the MGC 1b informs the VoIP terminal 2 of an RTP/hold sound or audible sound reproduction start command and a type of sound source data by using an RTP/hold sound or audible sound switching command function 14, the sound source data type notification function 16 and a LAN interface 12.

A call control function 24 of the VoIP terminal 2 receives notification about the RTP/hold sound or audible sound reproduction start command and the type of sound source data from the MGC 1b through the LAN interface 21 (step S53 of FIG. 16), and transfers the contents of the notification about the RTP/hold sound or audible sound reproduction start command and the type of sound source data to a hold sound or audible sound data selection function 28. The hold sound or audible sound data selection function 28 selects sound source data, which is designated by the notification about the type of sound source data, from hold sound and audible sound data 232 accumulated in a hold sound and audible sound data memory area 231 of a memory 23 in a payload format of an RTP packet (step S54 of FIG. 16).

Since the operation of the hold sound or audible sound reproduction processing or later (steps S55 to S60 of FIG. 16) is the same as that of the foregoing first embodiment, the description thereof will be omitted.

In this embodiment, as described above, the VoIP terminal 2 can specify the type of hold sound or audible sound data to be reproduced without judging the call state, because the designation of the type of hold sound or audible sound data used in reproduction is sent from the MGC 1b to the VoIP terminal 2 during the call control. Also, it is possible to prevent disparity in a state of hold sound or audible sound reproduction between the MGC 1b and the VoIP terminal 2.

Next, a seventh embodiment of the present invention will be described.

Figure 17:
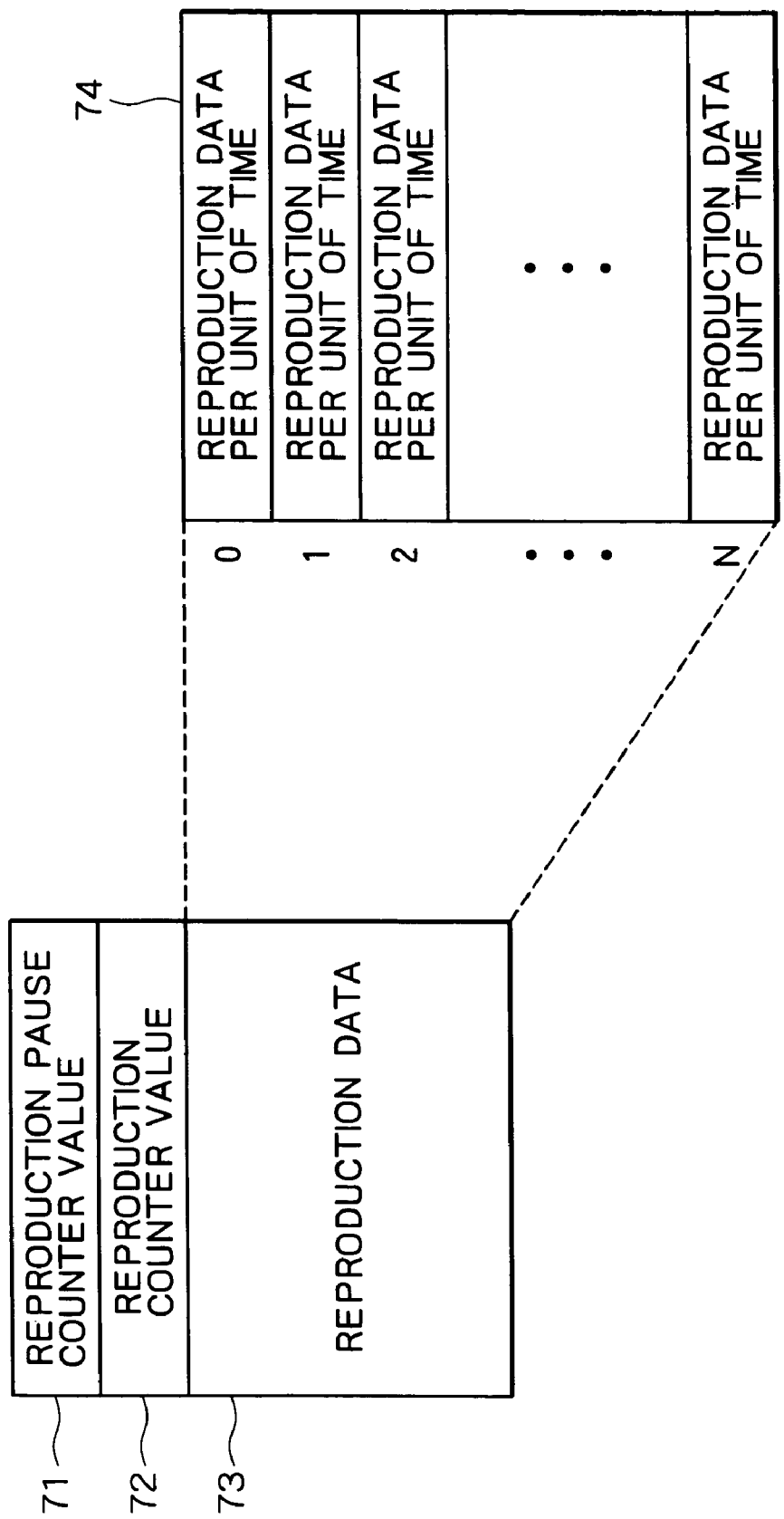
FIG. 17 is a diagram showing the structure of hold sound data and audible sound data used in an IP telephony system according to a seventh embodiment of the present invention.

FIG. 17 is a drawing showing the structure of hold sound data and audible sound data used in an IP telephony system according to this embodiment. Referring to FIG. 17, each of the hold sound data and the audible sound data comprises a reproduction pause counter value 71, a reproduction counter value 72, and reproduction data 73 being hold sound or audible sound data in a payload format of an RTP packet. The reproduction data 73 is composed of gathered reproduction data 74 per unit of time, the number of which is equal to or more than the reproduction counter value 72. The reproduction data 74 is the hold sound or audible sound data in the payload format of the RTP packet per unit of time, and the RTP packet is written into a DSP in reproduction.

The structure of the hold sound data and audible sound data according to this embodiment will be described with the use of the structure of a memory 23 shown in, for example, FIG. 9 according to the third embodiment. Referring to FIG. 9, hold sound data 2351 to 235N and audible sound data groups 235M to 235Z, each of which includes audible sound data #1 to #N, are stored on a hold sound and audible sound data hold area 234 of a non-volatile memory 233. Hold sound data 2381 and an audible sound data group 2382 including audible sound data #1 to #N are stored on a hold sound and audible sound data memory area 237 of a volatile memory 236.

Memory control and hold sound or audible sound reproduction processing on the foregoing hold sound data and audible sound data are the same as those of the foregoing first to sixth embodiments, the description thereof will be omitted. The hold sound data and audible sound data are also available in the VoIP terminals 2 and 2a to 2d according to the foregoing first to sixth embodiments.

According to this embodiment, as described above, each of the hold sound and audible sound data stored on the non-volatile memory 233 and the volatile memory 236 comprises payload data, the reproduction pause counter value, and the reproduction counter value. The payload data being sound source data itself is composed of a plurality of units of reproduction data of the time interval, at which the DSP 32 reads the RTP packet. Thus, it is possible to carry out intermittence control in reproducing a hold sound or audible sound, and hence it is possible to flexibly make the reproduction/pause timing of the hold sound or audible sound.

Next, an eighth embodiment of the present invention will be described.

Figure 18:
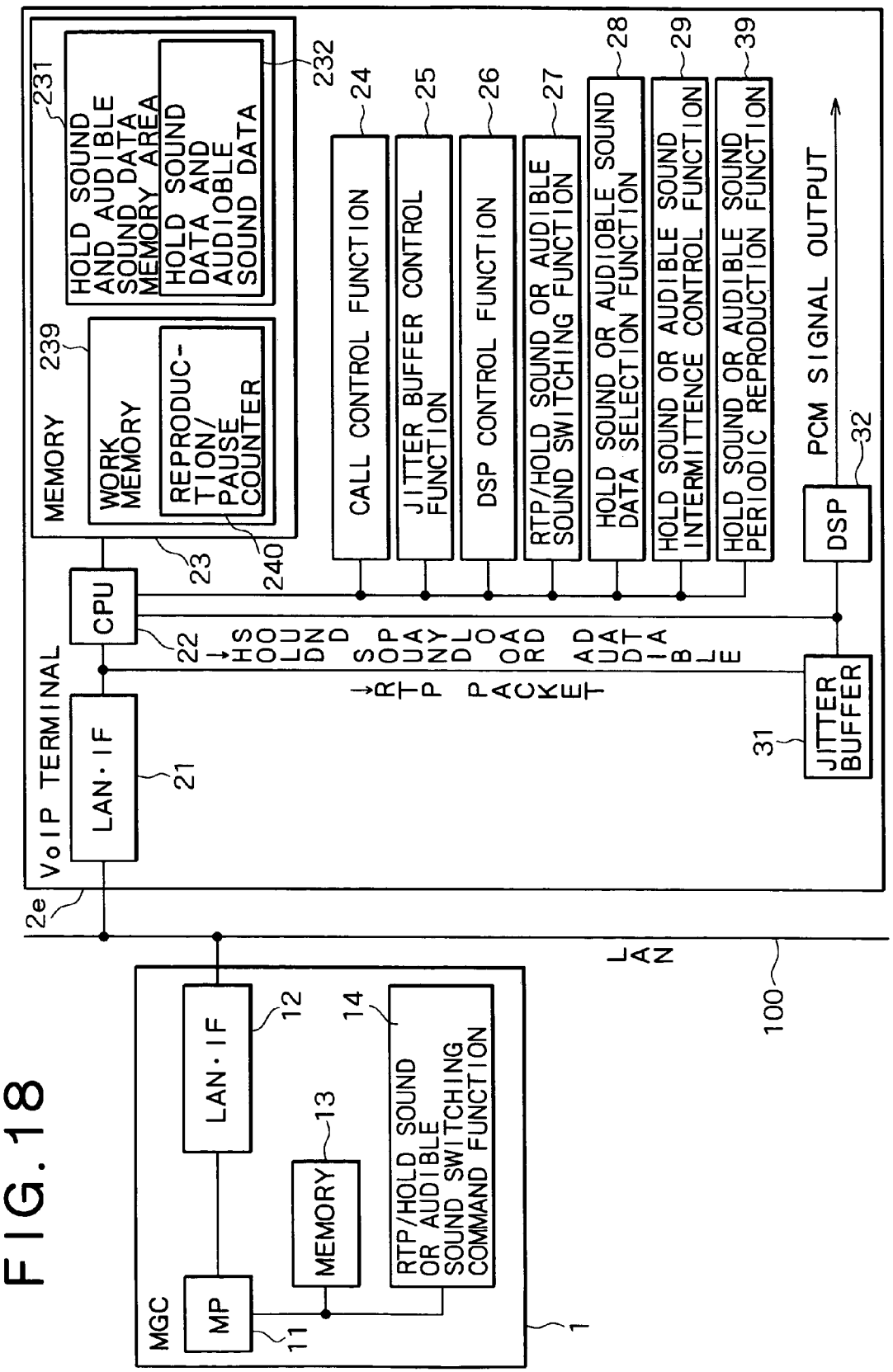
FIG. 18 is a block diagram showing the structure of an IP telephony system according to an eighth embodiment of the present invention.

FIG. 18 is a block diagram showing the structure of an IP telephony system according to this embodiment. Referring to FIG. 18, the IP telephony system according to this embodiment has the same structure as the IP telephony system of FIG. 3 according to the first embodiment, except that a hold sound or audible sound counter period reproduction function 39 is provided in a VoIP terminal 2e instead of the hold sound or audible sound periodic reproduction function 30. The same reference numbers as the first embodiment refer to identical components. Since hold sound data and audible sound data used in this embodiment has the same structure as the foregoing hold sound data and audible sound data shown in FIG. 17, the description thereof will be omitted.

According to this embodiment, in a method for reproducing a hold sound or audible sound in the VoIP terminal 2e of the IP telephony system by use of the hold sound or audible sound data in a payload format of an RTP packet, it is possible to flexibly reproduce a pattern by a combination of a reproduction pause counter value 71 and a reproduction counter value 72.

Figure 19:
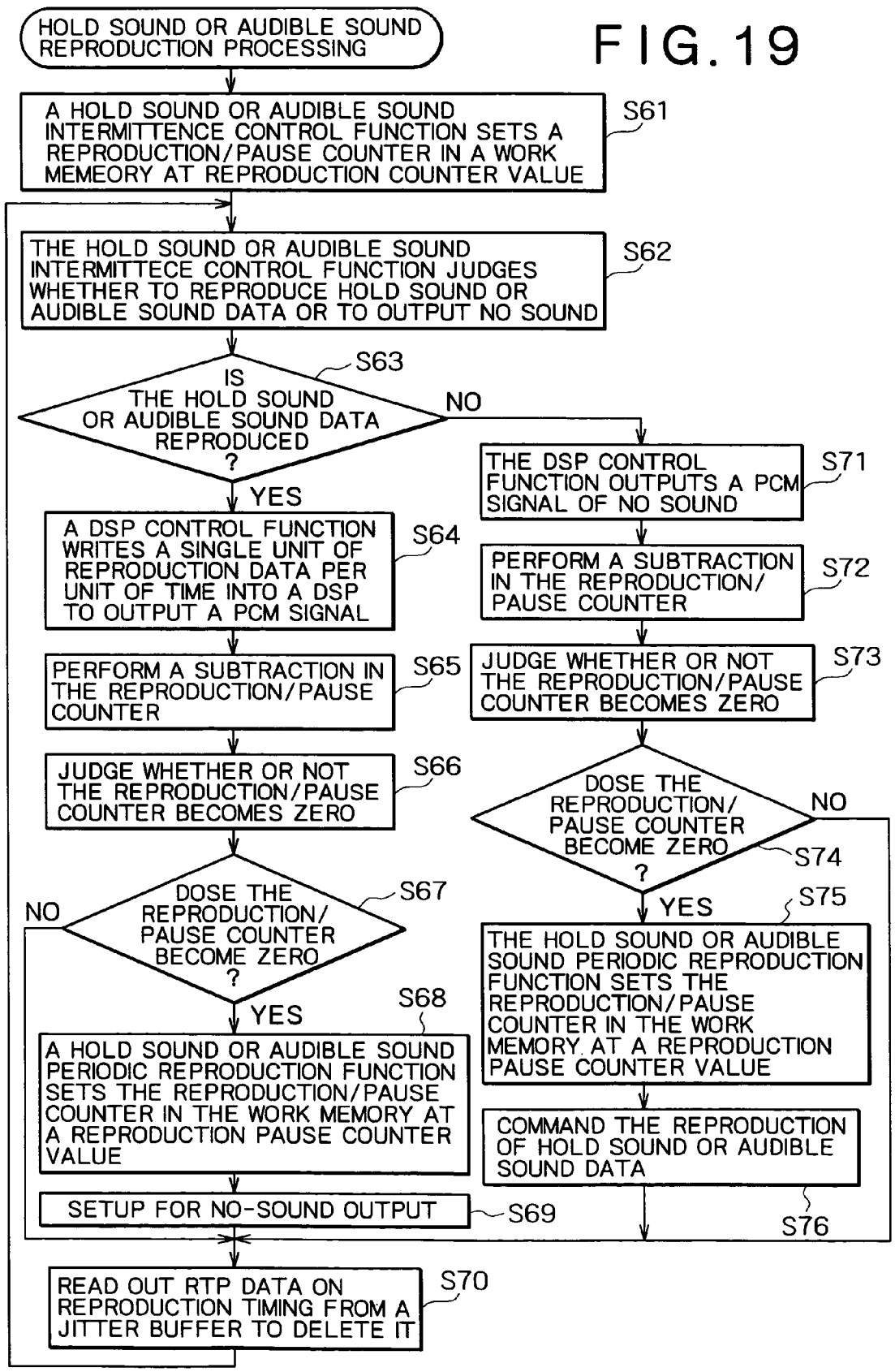
FIG. 19 is a flowchart showing the operation of a VoIP terminal of FIG. 18.

FIG. 19 is a flowchart showing the operation of the VoIP terminal 2e of FIG. 18, and FIGS. 20A and 20B are diagrams showing the reproduction timing of the hold sound or audible sound according to this embodiment. Referring to FIGS. 18, 19, 20A, and 20B, operation in the method for reproducing the hold sound or audible sound according to this embodiment will be described. Hold sound or audible sound reproduction processing shown in FIG. 19 is used for the hold sound and audible sound reproduction processing in the operational flow shown in FIG. 5 according to the first embodiment.

In the case where a CPU 22 of the VoIP terminal 2e reproduces the hold sound or audible sound data, the hold sound or audible sound counter period reproduction function 39 sets the reproduction counter value 72 of the hold sound data or audible sound data 232, which is in a hold sound and audible sound data memory area 231, on a reproduction/pause counter 240 of a work memory 239 of a memory 23 (step S61 of FIG. 19), and the hold sound or audible sound intermittence control function 29 sets the reproduction of the hold sound or audible sound data.

The hold sound or audible sound intermittence control function 29 judges whether to reproduce the hold sound or audible sound data or to output no sound (step S62 of FIG. 19). When the hold sound or audible sound data is reproduced (step S63 of FIG. 19), one unit of reproduction data 74 per unit of time, which is arranged from 0th to Nth, of reproduction data 73 of the hold sound data or audible sound data 232 in the hold sound and audible sound data memory area 231 of the memory 23 is written into a DSP 32 by use of a DSP control function 26. The DSP 32 outputs a PCM signal of the written hold sound and audible sound data (step S64 of FIG. 19).

To be more specific, reproduction data 74 per unit of time, which has the next number to data written last time, is successively written into the DSP 32 at time intervals, at which the DSP 32 takes in the RTP packet.

The hold sound and audible sound counter period reproduction function 39 performs a subtraction in the reproduction/pause counter 240 (step S65 of FIG. 19), and judges whether or not the reproduction/pause counter 240 becomes zero (step S66 of FIG. 19). When the reproduction/pause counter 240 becomes zero (step S67 of FIG. 19), the hold sound or audible sound counter period reproduction function 39 sets the reproduction pause counter value 71 on the reproduction/pause counter 240 (step S68 of FIG. 19). The hold sound or audible sound intermittence control function 29 sets no-sound output on the DSP 32 (step S69 of FIG. 19), and moves on to processing inside a jitter buffer 31.

When the reproduction/pause counter 240 does not become zero (step S67 of FIG. 19), the hold sound or audible sound counter period reproduction function 39 moves on to the processing inside the jitter buffer 31 without changing the reproduction/pause counter 240 and setting no-sound output.

The hold sound or audible sound intermittence control function 29 judges whether to reproduce the hold sound or audible sound data or to output no sound (step S62 of FIG. 19). When no-sound output is carried out (step S63 of FIG. 19), the hold sound or audible sound intermittence control function 29 pauses the write operation of reproduction data 74 per unit of time into the DSP 32, so that the DSP control function 26 outputs a PCM signal of no-sound from the DSP 32 (step S71 of FIG. 19).

The hold sound or audible sound counter period reproduction function 39 performs a subtraction in the reproduction/pause counter 240 (step S72 of FIG. 19), and judges whether or not the reproduction/pause counter 240 becomes zero (step S73 of FIG. 19). When the reproduction/pause counter 240 becomes zero (step S74 of FIG. 19), the hold sound or audible sound counter period reproduction function 39 sets the reproduction counter value 72 on the reproduction/pause counter 240 (step S75 of FIG. 19). The hold sound or audible sound intermittence control function 29 sets the reproduction of the hold sound or audible sound data (step S71 of FIG. 19), and moves on to the processing inside the jitter buffer 31.

When the reproduction/pause counter 240 does not become zero (step S74 of FIG. 19), the hold sound or audible sound counter period reproduction function 39 moves on to the processing inside the jitter buffer 31 without changing the reproduction/pause counter 240 and setting the reproduction of the hold sound or audible sound data.

In the processing inside the jitter buffer 31, reproduced voice RTP packet data in reproduction timing inside the jitter buffer 31 is read out and deleted (step S70 of FIG. 19), if the hold sound or audible sound data is not reproduced. Then, operation returns to judgment processing by the hold sound or audible sound intermittence control function 29, in which whether to reproduce the hold sound or audible sound data or to output no sound is judged (pattern reproduction of the hold sound or audible sound data and no-sound output).

Then, the pattern reproduction of the hold sound or audible sound data and the no-sound output according to this embodiment will be described with reference to FIGS. 20A and 20B. Referring to FIGS. 20A and 20B, hold sound or audible sound data reproduction processing is carried out by use of the reproduction pause counter value 71 and the reproduction counter value 72 in this embodiment. Taking the case of the hold sound or audible sound data having a reproduction pause counter value 71 of "3" and a reproduction counter value 72 of "5," for example, pattern reproduction including hold sound or audible sound data reproduction A1 and no-sound output A2 is carried out (refer to FIG. 20A).

In the case of the hold sound or audible sound data with a reproduction pause counter value 71 of "0" and a reproduction counter value 72 of "5," for example, pattern reproduction, which only includes hold sound or audible sound data reproduction A3 and does not include no-sound output, is carried out in this embodiment (refer to FIG. 20B).

According to this embodiment, as described above, the hold sound or audible sound data has the reproduction pause counter value 71 and the reproduction counter value 72, and the work memory 239 in the memory 23 is provided with the reproduction pause counter 240. A method by which the reproduction pause counter value 71 and the reproduction counter value 72 are alternately set when the reproduction pause counter 240 is zero is adopted, so that it is possible to make the reproduction/pause timing of the hold sound or audible sound n times as much as the time interval, at which the DSP 32 takes in the RTP packet.

Next, a ninth embodiment will be described.

Figure 21:
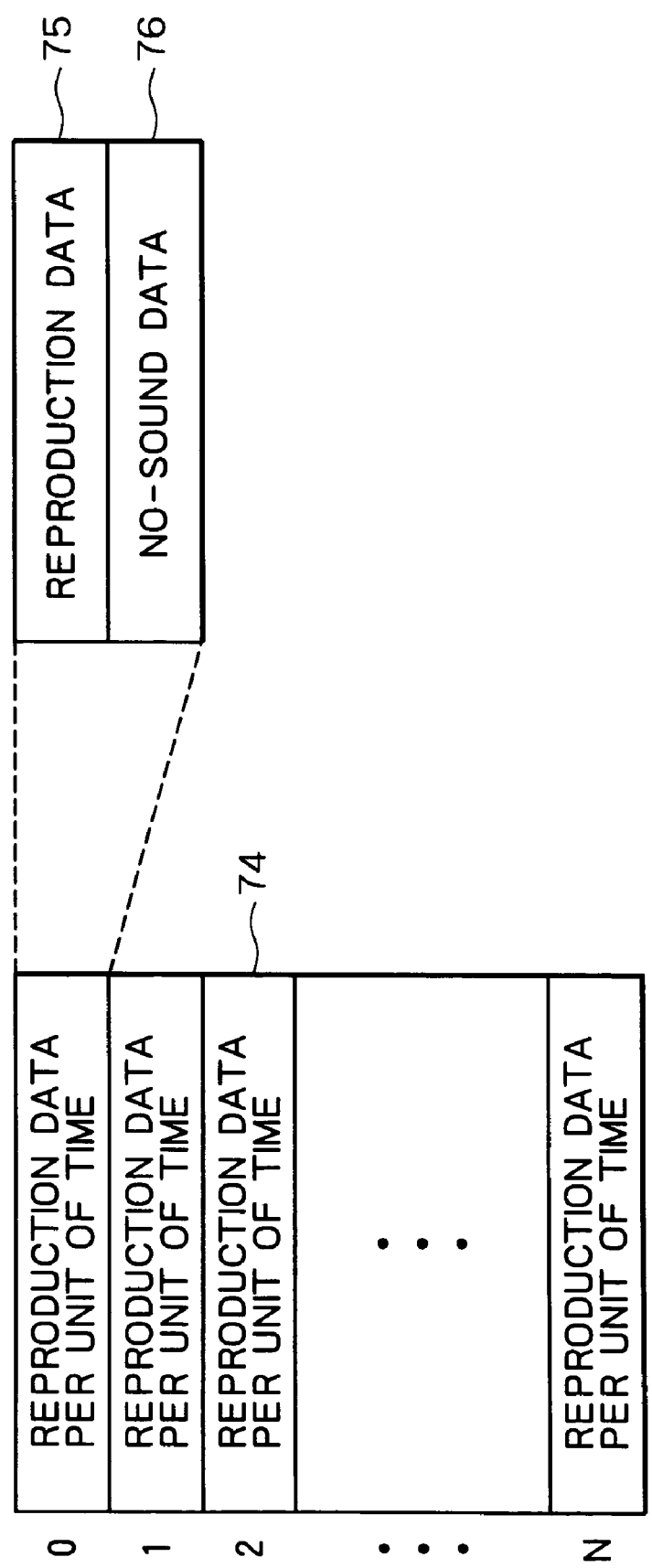
FIG. 21 is a diagram showing the structure of reproduction data of hold sound data and audible sound data according to a ninth embodiment of the present invention.

FIG. 21 is a diagram showing the structure of reproduction data of hold sound data or audible sound data according to this embodiment. An IP telephony system according to this embodiment has the same structure as the IP telephony system shown in FIG. 18 according to the eighth embodiment. Hold sound data and audible sound data according to this embodiment has the same structure as the hold sound data and audible sound data shown in FIG. 17, and hence the description thereof will be omitted.

Of the structure of the hold sound data and audible sound data shown in FIG. 17, FIG. 21 shows the structure of reproduction data 73. Reproduction data 74 per unit of time includes a reproduction data section 75 and a no-sound data section 76.

According to this embodiment, in a method for reproducing a hold sound or audible sound by the hold sound or audible sound data in a payload format of an RTP packet, since the reproduction data 74 per unit of time is composed of the reproduction data section 75 and the no-sound data section 76, it is possible to carry out the pattern reproduction of the hold sound or audible sound by using a pattern shorter than a unit of time, in which a DSP control function 26 writes data into a DSP 32.

Figure 22:
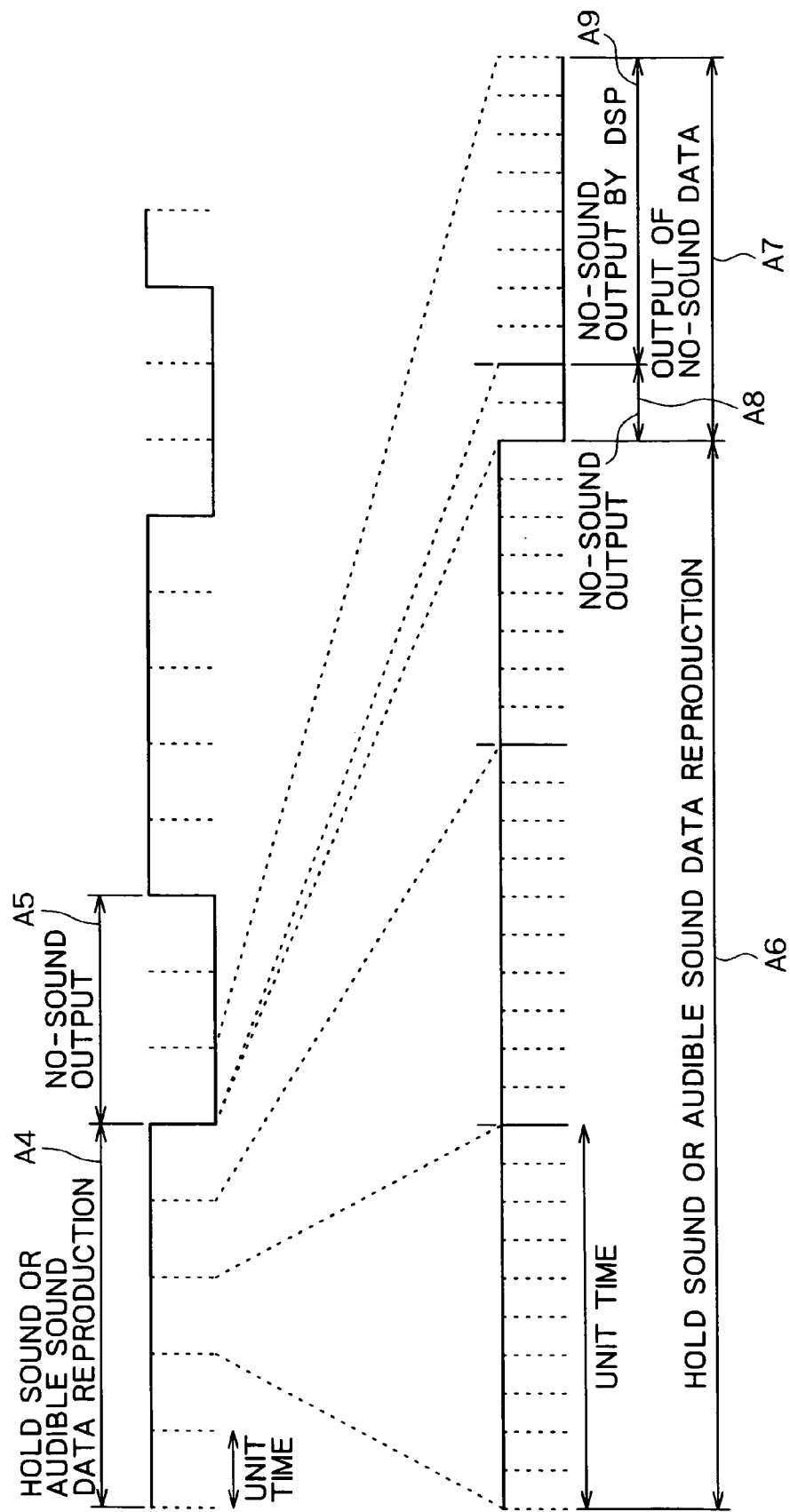
FIG. 22 is a diagram showing the reproduction timing of a hold sound and audible sound according to the ninth embodiment of the present invention.

FIG. 22 is a diagram showing the timing of reproduction of the hold sound or audible sound according to this embodiment. The pattern reproduction of the hold sound or audible sound data and the no-sound output according to this embodiment will be described with reference to FIG. 22.

Referring to FIG. 22, the reproduction data 74 of the hold sound or audible sound per unit of time is composed of the reproduction data section 75 and the no-sound data section 76, and hold sound or audible sound data reproduction processing is carried out. When the hold sound or audible sound data has a reproduction pause counter value 71 of "3" and a reproduction counter value 72 of "5," and four-fifth of the reproduction data 74 per unit of time, which is fifthly reproduced, is assigned to the reproduction data section 75 and one-fifth thereof is assigned to the no-sound data section 76, for example, pattern reproduction including hold sound or audible sound data reproduction A4 and no-sound output A5 is carried out (in a drawing with enlarged timing, hold sound or audible sound data reproduction A6 and no-sound output A7).

In this case, the DSP control function 26 writes the no-sound data section 76 of the reproduction data 74 per unit of time into the DSP 32, and the DSP 32 outputs a PCM signal of the written no-sound data section 76 in a no-sound data reproduction section A8 of the no-sound output A7. Then, the DSP control function 26 makes the DSP 32 output a PCM signal of no sound in a no-sound output section A9.

Since the operation of hold sound or audible sound reproduction processing according to this embodiment is the same as the foregoing hold sound or audible sound reproduction processing shown in FIG. 20 according to the eighth embodiment, the description thereof will be omitted.

According to this embodiment, as described above, the reproduction data section 75 and the no-sound data section 76 are stored in a single unit of payload data as payload data. Therefore, it is possible to make the reproduction/pause timing of the hold sound or audible sound within a time interval, at which the DSP 32 takes in the RTP packet.

The present invention is also applicable to a LAN except for Ethernet (R) such as, for example, Giga Ethernet (R), and is applicable to a network for reproducing a hold sound or audible sound.

What is claimed is:

1. An IP telephony system comprising:
   a VoIP (Voice over Internet Protocol) terminal; and
   a gateway controller for call controlling the VoIP terminal through a transmission line,
   said VoIP terminal including:
   a jitter buffer for temporality holding a voice packet inputted through the transmission line to absorb delay;
   a conversion section for converting the voice packet held by the jitter buffer into a voice signal;
   a data memory area for holding a plurality of types of hold sound or audible sound data in a payload format of the voice packet;
   a data selection section for selecting a hold sound or an audible sound to be reproduced from the plurality of types of hold sound or audible sound data held in the data memory area;
   a switching section for selecting any one of the voice packet and the hold sound or audible sound data to output it to the conversion section;
   a control section for controlling writing of any one of the voice packet and the hold sound or audible sound data into the conversion section, or for commanding the conversion section to output no sound;
   an intermittence control section for controlling the intermittence of the hold sound or audible sound by restricting the input of the hold sound or audible sound data into the conversion section; and
   a periodic reproduction section for periodically outputting the hold sound or audible sound data to the conversion section;
   wherein said conversion section converts the voice packet and the hold sound or audible sound data held in the data memory area into the voice signal.

2. The IP telephony system according to claim 1, wherein the VoIP terminal is at least one of a media gateway, a media converter, and an IP (Internet Protocol) telephone terminal.

3. The IP telephony system according to claim 1, wherein the transmission line is at least one of the Internet, an intranet, and a LAN (Local Area Network).

4. The IP telephony system according to claim 1, wherein the voice packet is at least an RTP (Real-time Transport Protocol) packet for voice.

5. The IP telephony system according to claim 1, wherein the conversion section is at least a DSP (Digital Signal Processor).

6. The IP telephony system according to claim 5, wherein a voice signal converted by the conversion section is at least a PCM (Pulse Code Modulation) signal.

7. The IP telephony system according to claim 1, wherein the data memory area comprises a non-volatile memory for storing the plurality of types of hold sound and audible sound data, and a volatile memory into which the hold sound or audible sound data on the non-volatile memory is copied.

8. The IP telephony system according to claim 7, wherein the VoIP terminal includes a copy section for copying the hold sound and audible sound data on the non-volatile memory into the volatile memory when the VoIP terminal is activated.

9. The IP telephony system according to claim 7, wherein the non-volatile memory includes at least an FROM (Flash Read Only Memory).

10. The IP telephony system according to claim 7, wherein the volatile memory includes at least an SDRAM (Synchronous Dynamic Random Access Memory).

11. The IP telephony system according to claim 7, wherein the plurality of types of hold sound and audible sound data stored on the non-volatile memory are sorted and grouped on the basis of information organized by country, information specific to a user, and information about a PCM code rule, and the grouped hold sound and audible sound data is copied into the volatile memory.

12. The IP telephony system according to claim 7, wherein the VoIP terminal includes:
    a registration request section for making a terminal registration request to the gateway controller when the VoIP terminal is activated; and
    a sort and copy section for sorting and grouping the hold sound and audible sound data from the plurality of types of hold sound and audible sound data stored on the non-volatile memory on the basis of information organized by country, information specific to a user, and information about a PCM code rule specified by the gateway controller in response to the terminal registration request, and for copying the grouped hold sound and audible sound data into the volatile memory.

13. The IP telephony system according to claim 1, further comprising:
    a download server for accumulating the plurality of types of hold sound and audible sound data; and
    a download section provided in the VoIP terminal, the download section writing the hold sound and audible sound data downloaded from the download server into the data memory area on the basis of an external command.

14. The IP telephony system according to claim 1, wherein the VoIP terminal includes a sound source data selection section for selecting sound source data, the sound source data is designated by the gateway controller in accordance with a state of call control, and is converted by the conversion section on the basis of a type of sound source data to be reproduced.

15. The IP telephony system according to claim 1, wherein the hold sound or audible sound data comprises a reproduction pause counter value, a reproduction counter value, and reproduction data in a payload format of the voice packet, and the reproduction data includes a plurality of units of payload data of a time interval, at which the conversion section takes in the voice packet.

16. The IP telephony system according to claim 15, wherein:
    the VoIP terminal includes: a section for performing a subtraction of the reproduction pause counter value or the reproduction counter value at time intervals, at which the conversion section takes in the voice packet, until the reproduction pause counter value or the reproduction counter value becomes zero; and a section for outputting the payload data of the reproduction data to the conversion section one by one whenever the reproduction counter value is subtracted; and
    the reproduction pause counter value is subtracted when the reproduction counter value becomes zero by the subtraction, writing of the reproduction data into the conversion section is paused to output no sound until the reproduction pause counter value becomes zero, and the reproduction counter value is subtracted when the reproduction pause counter value becomes zero by the subtraction.

17. The IP telephony system according to claim 16, wherein
a single unit of payload data of the reproduction data includes reproduction sound data and no-sound data as payload data, when reproducing pause time within the time interval, at which the conversion section takes in the voice packet.

18. A VoIP terminal, which is call controlled by a gateway controller through a transmission line, comprising:
a jitter buffer for temporality holding a voice packet inputted through the transmission line to absorb delay;
a conversion section for converting the voice packet held by the jitter buffer into a voice signal;
a data memory area for holding a plurality of types of hold sound or audible sound data in a payload format of the voice packet;
a data selection section for selecting a hold sound or an audible sound to be reproduced from the plurality of types of hold sound or audible sound data held in the data memory area;
a switching section for selecting any one of the voice packet and the hold sound or audible sound data and outputting it to the conversion section;
a control section for controlling writing of any one of the voice packet and the hold sound or audible sound data into the conversion section, or for commanding the conversion section to output no sound;
an intermittence control section for controlling the intermittence of the hold sound or audible sound by restricting the input of the hold sound or audible sound data into the conversion section; and
a periodic reproduction section for periodically outputting the hold sound or audible sound data to the conversion section,
wherein the conversion section converts the voice packet and the hold sound or audible sound data held in the data memory area into the voice signal.

19. The VoIP terminal according to claim 18, wherein
the VoIP terminal is at least one of a media gateway, a media converter, and an IP (Internet Protocol) telephone terminal.

20. The VoIP terminal according to claim 18, wherein
the transmission line is at least one of the Internet, an intranet, and a LAN (Local Area Network).

21. The VoIP terminal according to claim 18, wherein
the voice packet is at least an RTP (Real-time Transport Protocol) packet for voice.

22. The VoIP terminal according to claim 18, wherein
the conversion section is at least a DSP (Digital Signal Processor).

23. The VoIP terminal according to claim 22, wherein
a voice signal converted by the conversion section is at least a PCM (Pulse Code Modulation) signal.

24. The VoIP terminal according to claim 18, wherein
the data memory area comprises a non-volatile memory for storing the plurality of types of hold sound and audible sound data, and a volatile memory into which the hold sound or audible sound data on the non-volatile memory is copied.

25. The VoIP terminal according to claim 24, further comprising a copy section for copying the hold sound and audible sound data on the non-volatile memory into the volatile memory when the VoIP terminal is activated.

26. The VoIP terminal according to claim 24, wherein
the non-volatile memory includes at least an FROM (Flash Read Only Memory).

27. The VoIP terminal according to claim 24, wherein
the volatile memory includes at least an SDRAM (Synchronous Dynamic Random Access Memory).

28. The VoIP terminal according to claim 24, wherein
the plurality of types of hold sound and audible sound data stored on the non-volatile memory are sorted and grouped on the basis of information organized by country, information specific to a user, and information about a PCM code rule, and the grouped hold sound and audible sound data is copied into the volatile memory.

29. The VoIP terminal according to claim 24, further comprising:
a registration request section for making a terminal registration request to the gateway controller when the VoIP terminal is activated; and
a sort and copy section for sorting and grouping the hold sound and audible sound data from the plurality of types of hold sound and audible sound data stored on the non-volatile memory on the basis of information organized by country, information specific to a user, and information about a PCM code rule specified by the gateway controller in response to the terminal registration request, and for copying the grouped hold sound and audible sound data into the volatile memory.

30. The VoIP terminal according to claim 18, further comprising a download section provided in the VoIP terminal, the download section writing the hold sound and audible sound data downloaded from a download server into the data memory area on the basis of an external command, the download server accumulating the plurality of types of hold sound and audible sound data.

31. The VoIP terminal according to claim 18, further comprising a sound source data selection section for selecting sound source data, the sound source data being designated by the gateway controller in accordance with a state of call control, and converted by the conversion section on the basis of a type of sound source data to be reproduced.

32. The VoIP terminal according to claim 18, wherein
the hold sound or audible sound data comprises a reproduction pause counter value, a reproduction counter value, and reproduction data in a payload format of the voice packet, and the reproduction data includes a plurality of units of payload data of a time interval, at which the conversion section takes in the voice packet.

33. The VoIP terminal according to claim 32, further comprising: a section for performing a subtraction of the reproduction pause counter value or the reproduction counter value at time intervals, at which the conversion section takes in the voice packet, until the reproduction pause counter value or the reproduction counter value becomes zero; and a section for outputting the payload data of the reproduction data to the conversion section one by one whenever the reproduction counter value is subtracted, wherein
the reproduction pause counter value is subtracted when the reproduction counter value becomes zero by the subtraction, writing of the reproduction data into the conversion section is paused to output no sound until the reproduction pause counter value becomes zero, and the reproduction counter value is subtracted when the reproduction pause counter value becomes zero by the subtraction.

34. The VoIP terminal according to claim 33, wherein
a single unit of payload data of the reproduction data includes reproduction sound data and no-sound data as payload data, when reproducing pause time within the time interval, at which the conversion section takes in the voice packet.

35. A method for reproducing a hold sound or an audible sound, which is applicable to an IP telephony system including a VoIP (voice over internet protocol) terminal and a gateway controller for call controlling the VoIP terminal through a transmission line, the VoIP terminal including a jitter buffer for temporality holding a voice packet inputted through the transmission line to absorb delay, and a conversion section for converting the voice packet held by the jitter buffer into a voice signal, the method comprising the steps of:

selecting a hold sound or an audible sound to be reproduced from a plurality of types of hold sound or audible sound data held in a data memory area, which holds the plurality of types of hold sound or audible sound data in the VoIP terminal in a payload format of the voice packet;

selecting any one of the voice packet and the hold sound or audible sound data, and outputting it to the conversion section;

controlling writing of any one of the voice packet and the hold sound or audible sound data into the conversion section, or commanding the conversion section to output no sound;

controlling the intermittence of the hold sound or the audible sound by restricting the input of the hold sound or audible sound data into the conversion section; and periodically outputting the hold sound or audible sound data to the conversion section, wherein the conversion section converts the voice packet and the hold sound or audible sound data held in the data memory area into the voice signal.

36. The method according to claim 35, wherein
the VoIP terminal is at least one of a media gateway, a media converter, and an IP (Internet Protocol) telephone terminal.

37. The method according to claim 35, wherein
the transmission line is at least one of the Internet, an intranet, and a LAN (Local Area Network).

38. The method according to claim 35, wherein
the voice packet is at least an RTP (Real-time Transport Protocol) packet for voice.

39. The method according to claim 35, wherein
the conversion section is at least a DSP (Digital Signal Processor).

40. The method according to claim 39, wherein
a voice signal converted by the conversion section is at least a PCM (Pulse Code Modulation) signal.

41. The method according to claim 35, wherein
the data memory area comprises a non-volatile memory for storing the plurality of types of hold sound and audible sound data, and a volatile memory into which the hold sound or audible sound data on the non-volatile memory is copied.

42. The method according to claim 41, wherein
the VoIP terminal includes a copy section for copying the hold sound and audible sound data on the non-volatile memory into the volatile memory when the VoIP terminal is activated.

43. The method according to claim 41, wherein
the non-volatile memory includes at least an FROM (Flash Read Only Memory).

44. The method according to claim 41, wherein
the volatile memory includes at least an SDRAM (Synchronous Dynamic Random Access Memory).

45. The method according to claim 41, wherein
the plurality of types of hold sound and audible sound data stored on the non-volatile memory are sorted and grouped on the basis of information organized by country, information specific to a user, and information about a PCM code rule, and the grouped hold sound and audible sound data is copied into the volatile memory.

46. The method according to claim 41, further comprising, at the VoIP terminal side, the steps of:

making a terminal registration request to the gateway controller when the VoIP terminal is activated; and sorting and grouping the hold sound and audible sound data from the plurality of types of hold sound and audible sound data stored on the non-volatile memory on the basis of information organized by country, information specific to a user, and information about a PCM code rule specified by the gateway controller in response to the terminal registration request, and copying the grouped hold sound and audible sound data into the volatile memory.

47. The method according to claim 35, further comprising, at the VoIP side, the step of writing the hold sound and audible sound data downloaded from a download server into the data memory area on the basis of an external command, the download server accumulating the plurality of types of hold sound and audible sound data.

48. The method according to claim 35, further comprising, at the VoIP side, the step of selecting sound source data, the sound source data being designated by the gateway controller in accordance with a state of call control, and converted by the conversion section on the basis of a type of sound source data to be reproduced.

49. The method according to claim 35, wherein
the hold sound or audible sound data comprises a reproduction pause counter value, a reproduction counter value, and reproduction data in a payload format of the voice packet, and the reproduction data includes a plurality of units of payload data of a time interval, at which the conversion section takes in the voice packet.

50. The method according to claim 49, further comprising, at the VoIP side, the steps of performing a subtraction of the reproduction pause counter value or the reproduction counter value at time intervals, at which the conversion section takes in the voice packet, until the reproduction pause counter value or the reproduction counter value becomes zero; and outputting the payload data of the reproduction data to the conversion section one by one whenever the reproduction counter value is subtracted, wherein the reproduction pause counter value is subtracted when the reproduction counter value becomes zero by the subtraction, writing of the reproduction data into the conversion section is paused to output no sound until the reproduction pause counter value becomes zero, and the reproduction counter value is subtracted when the reproduction pause counter value becomes zero by the subtraction.

51. The method according to claim 50, wherein
a single unit of payload data of the reproduction data includes reproduction sound data and no-sound data as payload data, when reproducing pause time within the time interval, at which the conversion section takes in the voice packet.

52. A computer-readable storage medium having computer-executable instructions for reproducing a hold sound or an audible sound, being applicable to an IP telephony system, which comprises a VoIP (Voice over Internet Protocol) terminal and a gateway controller for call controlling the VoIP terminal through a transmission line, the VoIP terminal including a jitter buffer for temporality holding a voice packet inputted through the transmission line to absorb delay, and a conversion section for converting the voice packet held by the jitter buffer into a voice signal, the program makes instructions make a computer carry out processing of;

selecting a hold sound or an audible sound to be reproduced from a plurality of types of hold sound or audible sound data held in a data memory area, which holds the plurality of types of hold sound and audible sound data in a payload format of the voice packet;

selecting any one of the voice packet and the hold sound or audible sound data, and outputting it to the conversion section;

controlling writing of any one of the voice packet and the hold sound or audible sound data into the conversion section, or commanding the conversion section to output no sound;

controlling the intermittence of the hold sound or the audible sound by restricting the input of the hold sound or audible sound data into the conversion section; and periodically outputting the hold sound or audible sound data to the conversion section, wherein the conversion section converts the voice packet and the hold sound or audible sound data held in the data memory area into the voice signal.

\* \* \* \* \*